US011315303B2

(12) United States Patent
Saeed et al.

(10) Patent No.: US 11,315,303 B2
(45) Date of Patent: Apr. 26, 2022

(54) GRAPHICS PROCESSING

(71) Applicants:Arm Limited, Cambridge (GB); Apical Limited, Cambridge (GB)

(72) Inventors: Sharjeel Saeed, Cambridge (GB); Daren Croxford, Swaffham Prior (GB); Mathieu Jean Joseph Robart, Papworth Everard (GB)

(73) Assignees: Arm Limited, Cambridge (GB); Apical Limited, Cambridge (GB)

( * ) Notice: Subject to any disclaimer, the term of this patent is extended or adjusted under 35 U.S.C. 154(b) by 0 days.

(21) Appl. No.: 16/829,940

(22) Filed: Mar. 25, 2020

(65) Prior Publication Data

US 2021/0304489 A1    Sep. 30, 2021

(51) Int. Cl.
*G06T 15/06*   (2011.01)
*G06T 1/20*    (2006.01)

(52) U.S. Cl.
CPC ............. *G06T 15/06* (2013.01); *G06T 1/20* (2013.01); *G06T 2200/28* (2013.01)

(58) Field of Classification Search
CPC ........ G06T 15/06; G06T 1/20; G06T 2200/28
See application file for complete search history.

(56) References Cited

U.S. PATENT DOCUMENTS

| 2013/0016109 | A1  | 1/2013  | Garanzha |
| 2016/0314611 | A1* | 10/2016 | Shin ........................ G06T 15/06 |
| 2018/0365881 | A1* | 12/2018 | Peterson ................. G06T 15/06 |
| 2020/0051316 | A1  | 2/2020  | Laine et al. |

FOREIGN PATENT DOCUMENTS

EP         3457362         3/2019

OTHER PUBLICATIONS

Kopta, et al., "An Energy and Bandwidth Efficient Ray Tracing Architecture," HPG '13: Proceedings of the 5th High-Performance Graphics Conference, Jul. 2013 pp. 121-128, https://doi.org/10.1145/2492045.2492058.

(Continued)

*Primary Examiner* — Samantha (Yuehan) Wang
(74) *Attorney, Agent, or Firm* — Vierra Magen Marcus LLP

(57) ABSTRACT

When a programmable execution unit of a graphics processor is executing a graphics processing program to render a frame that represents a view of a scene using a ray tracing process, and the ray tracing process requires the determination of geometry that will be intersected by a ray, the programmable execution unit sends a message to a ray tracing acceleration data structure traversal circuit of the graphics processor, for the ray tracing acceleration data structure traversal circuit to perform a traversal of a ray tracing acceleration data structure for the scene to determine geometry for the scene that may be intersected by the ray. The ray tracing acceleration data structure traversal circuit then returns to the programmable execution unit an indication of geometry that may be intersected by the ray, and the programmable execution unit uses the indicated geometry to determine any geometry that is intersected by the ray.

20 Claims, 9 Drawing Sheets

(56) References Cited

OTHER PUBLICATIONS

Lee, et al., "An energy efficient hardware multithreading scheme for mobile ray tracing," SA '14: SIGGRAPH Asia 2014 Mobile Graphics and Interactive Applications, Nov. 2014 Article No. 1 pp. 1-3, https://doi.org/10.1145/2669062.2669079.

Liktor, et al., "Bandwidth efficient BVH layout for incremental hardware traversal," Intel Corporation, HPG '16: Proceedings of High Performance Graphics, Jun. 2016, http://dx.doi.org/10.2312/hpg.20161192.

Wikipedia, "Bounding volume hierarchy," retrieved at https://en.wikipedia.org/w/index.php?title=Bounding_volume_hierarchy&oldid=921578869.

Liktor, et al., "Bandwidth-Efficient BVH Layout for Incremental Hardware Traversal," Intel Corporation, 2016, http://dx.doi.0rg/10.2312/hpg.20161192.

Mahovsky, et al., "Memory-Conserving Bounding Volume Hierarchies with Coherent Raytracing," 2006 Comput. Graph. Forum. 25. 173-182, DOI: 10.1111/j.1467-8659.2006.00933.x.

Nah, et al., "RayCore: A ray-tracing hardware architecture for mobile devices," ACM Transactions on Graphics, Sep. 2014 Article No. 162, https://doi.org/10.1145/2629634.

Lee, "Hardware Architecture for Incoherent Ray Tracing," Samsung Advanced Institute of Technology, Ray Tracing is the Future and Ever Will Be, ACM SIGGRAPH 2013.

Gunther, et al., "Realtime Ray Tracing on GPU with BVH-based Packet Traversal," 2007, IEEE Symposium on Interactive Ray Tracing 2007, DOI: 10.1109/RT.2007.4342598.

Keely, "Reduced Precision for Hardware Ray Tracing in GPUs," 2014 High-Performance Graphics 2014, DOI: 10.2312/hpg.20141091.

Lee, et al., "SGRT: A Mobile GPU Architecture for Real-Time Ray Tracing," Proceedings of ACM High Performance Graphics 2013, 109-119, https://doi.org/10.1145/2492045.2492057.

Govindaraju, et al., "Toward-a-multicore-architecture-for-real-time-ray-tracing," DOI: 10.1109/MICRO.2008.4771789.

Spjut, et al., "TRaX: A Multicore Hardware Architecture for Real-Time Ray Tracing," in IEEE Transactions on Computer-Aided Design of Integrated Circuits and Systems, vol. 28, No. 12, pp. 1802-1815, Dec. 2009, doi: 10.1109/TCAD.2009.2028981.

Combined Search and Examination Report dated Nov. 29, 2021, Application No. GB2103854.2.

Mehaboobathunnisa R., et al., "Ray Grouping Based Ray Casting for Visualization of Medical Data", International Conference on Computing Technologies and Intelligent Data Engineering (ICCTIDE'16), 2016, pp. 1-4.

\* cited by examiner

GRAPHICS PROCESSING

BACKGROUND

The technology described herein relates to graphics processing systems, and in particular to the rendering of frames (images) for display.

FIG. 1 shows an exemplary system on-chip (SoC) graphics processing system 8 that comprises a host processor in the form of a central processing unit (CPU) 1, a graphics processor (GPU) 2, a display processor 3 and a memory controller 5.

As shown in FIG. 1, these units communicate via an interconnect 4 and have access to off-chip memory 6. In this system, the graphics processor 2 will render frames (images) to be displayed, and the display processor 3 will then provide the frames to a display panel 7 for display.

In use of this system, an application 13 such as a game, executing on the host processor (CPU) 1 will, for example, require the display of frames on the display panel 7. To do this, the application will submit appropriate commands and data to a driver 11 for the graphics processor 2 that is executing on the CPU 1. The driver 11 will then generate appropriate commands and data to cause the graphics processor 2 to render appropriate frames for display and to store those frames in appropriate frame buffers, e.g. in the main memory 6. The display processor 3 will then read those frames into a buffer for the display from where they are then read out and displayed on the display panel 7 of the display.

One rendering process that may be performed by a graphics processor is so-called "ray tracing". Ray tracing is a rendering process which involves tracing the paths of rays of light from a viewpoint (sometimes referred to as a "camera") back through sampling positions in an image plane into a scene, and simulating the effect of the interaction between the rays and objects in the scene. The output data value, e.g., sampling point in the image, is determined based on the object(s) in the scene intersected by the ray passing through the sampling position, and the properties of the surfaces of those objects. The ray tracing calculation is complex, and involves determining, for each sampling position, a set of objects within the scene which a ray passing through the sampling position intersects.

Ray tracing is considered to provide better, i.e. more realistic, physically accurate images than rasterisation rendering techniques, particularly in terms of the ability to capture reflection, refraction, shadows and lighting effects. However, ray tracing can be significantly more processing-intensive than rasterisation.

The Applicants believe that there remains scope for improved techniques for performing ray tracing using a graphics processor.

BRIEF DESCRIPTION OF THE DRAWINGS

Embodiments of the technology described herein will now be described by way of example only and with reference to the accompanying drawings, in which.

Like reference numerals are used for like elements in the Figures where appropriate.

DETAILED DESCRIPTION

Figure 1:
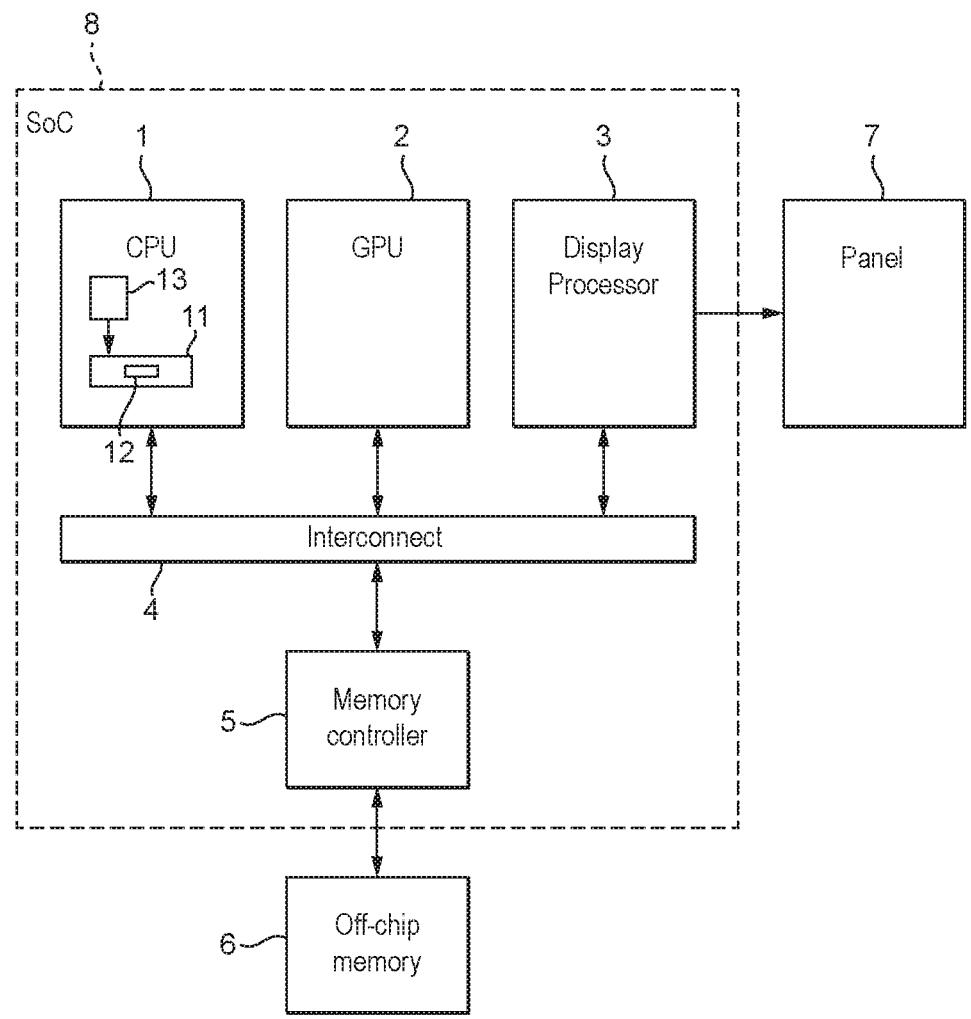
FIG. 1 shows an exemplary graphics processing system.

A first embodiment of the technology described herein comprises a method of operating a graphics processor when rendering a frame that represents a view of a scene comprising one or more objects using a ray tracing process, the graphics processor comprising:

a programmable execution unit operable to execute graphics processing programs to perform graphics processing operations; and a ray tracing acceleration data structure traversal circuit operable to perform a traversal of a ray tracing acceleration data structure indicative of the distribution of geometry for a scene to be rendered to determine geometry for a scene to be rendered that may be intersected by a ray being used for a ray tracing operation;

wherein:

the programmable execution unit is operable to communicate with the ray tracing acceleration data structure traversal circuit to cause the ray tracing acceleration data structure to perform a traversal of a ray tracing acceleration data structure for a ray, and to receive responses from the ray tracing data structure traversal circuit indicative of geometry that may be intersected by the ray that has been determined by the ray tracing acceleration data structure traversal circuit;

the method comprising:

the programmable execution unit:

executing a graphics processing program to render a frame that represents a view of a scene comprising one or more objects using a ray tracing process; and when executing the program and the ray tracing process requires the determination of geometry that will be intersected by a ray, sending a message to the ray tracing acceleration data structure traversal circuit to perform a traversal of a ray tracing acceleration data structure for the scene to determine geometry for the scene that may be intersected by the ray;

the ray tracing acceleration data structure traversal circuit in response to the message from the programmable execution unit:

performing a traversal of a ray tracing acceleration data structure for the scene for the ray to determine geometry for the scene to be rendered that may be intersected by the ray and providing an indication of geometry that may be intersected by the ray; and the programmable execution unit:

using the indicated geometry determined by the ray tracing acceleration data structure traversal circuit to determine any geometry that is intersected by the ray; and performing further processing for a sampling position in the frame that the ray corresponds to in accordance with any geometry for the scene determined to be intersected by the ray.

A second embodiment of the technology described herein comprises a graphics processor operable to render a frame that represents a view of a scene comprising one or more objects using a ray tracing process, the graphics processor comprising:

a programmable execution unit operable to execute graphics processing programs to perform graphics processing operations; and a ray tracing acceleration data structure traversal circuit operable to perform a traversal of a ray tracing acceleration data structure indicative of the distribution of geometry for a scene to be rendered to determine geometry for a scene to be rendered that may be intersected by a ray being used for a ray tracing operation;

wherein:

the programmable execution unit is configured to communicate with the ray tracing acceleration data structure traversal circuit to cause the ray tracing acceleration data structure to perform a traversal of a ray tracing acceleration data structure for a ray, and to receive responses from the ray tracing data structure traversal circuit indicative of geometry that may be intersected by the ray that has been determined by the ray tracing acceleration data structure traversal circuit;

the programmable execution unit is further configured to:
execute a graphics processing program to render a frame that represents a view of a scene comprising one or more objects using a ray tracing process; and
when executing the program and the ray tracing process requires the determination of geometry that will be intersected by a ray, send a message to the ray tracing acceleration data structure traversal circuit to perform a traversal of a ray tracing acceleration data structure for the scene to determine geometry for the scene that may be intersected by the ray;

the ray tracing acceleration data structure traversal circuit is configured to:
in response to a message from the programmable execution unit to perform a traversal of a ray tracing acceleration data structure for a scene to be rendered to determine geometry for the scene that may be intersected by a ray:
perform a traversal of the ray tracing acceleration data structure for the scene for the ray to determine geometry for the scene to be rendered that may be intersected by the ray and provide an indication of geometry that may be intersected by the ray; and the programmable execution unit is further configured to:
use indicated geometry determined by the ray tracing acceleration data structure traversal circuit to determine any geometry that is intersected by a ray; and
perform further processing for a sampling position in a frame that a ray corresponds to in accordance with any geometry for the scene determined to be intersected by the ray.

The technology described herein relates to the performing of ray tracing on a graphics processor. In the technology described herein, the ray tracing operation uses an acceleration data structure, such as a bounding volume hierarchy, representative of geometry in the scene that is to be rendered to determine the intersection of rays with geometry (e.g. objects) in the scene being rendered (and then renders sampling positions in the output rendered frame representing the scene accordingly).

In the technology described herein, the ray tracing operation is performed by a programmable execution unit of the graphics processor executing a graphics processing program to perform the ray tracing operation. However, as part of the ray tracing operation, the programmable execution unit triggers a ray tracing acceleration data structure traversal circuit to perform any necessary ray tracing acceleration data structure traversal operations to determine geometry that could be intersected by a ray that is being used to render a sampling position in the frame.

The ray tracing acceleration data structure traversal circuit then traverses the ray tracing acceleration data structure and returns an indication of geometry that could intersect the ray in question to the programmable execution unit, with the programmable execution unit then using that indication of the geometry to determine whether there is any geometry that is intersected by the ray (and then further processing a sampling position corresponding to the ray accordingly, such as, and in an embodiment, and as will be discussed further below, by casting a further ray for the sampling position and/or rendering (shading) the sampling position).

In other words, rather than the programmable execution unit performing the full ray tracing ray intersection determination operation, including traversing an acceleration data structure to determine geometry that could be intersected by a ray and then determining whether any geometry is actually intersected by the ray, the programmable execution unit offloads some of that processing, and in particular the operation of traversing the ray tracing acceleration data structure to determine geometry that could be intersected by a ray, to an associated ray tracing acceleration data structure traversal circuit (that is configured to, and that operates to, perform the ray tracing acceleration data structure traversal to identify geometry that could be intersected by a ray), which ray tracing acceleration data structure traversal circuit then returns an indication of the geometry to be considered to the programmable execution unit for further use during the ray tracing rendering operation (and in particular for the programmable execution unit to then determine any geometry that is actually intersected by the ray).

This then has the effect of performing some of the ray tracing operation (namely the ray tracing acceleration data structure traversal operation) using a circuit (hardware) that is dedicated for that purpose (rather than, e.g., performing that operation using more general programmable processing circuitry that is programmed to perform the required operation). This can then lead to accelerated and more efficient traversing of the ray tracing acceleration data structures, as compared, for example, to arrangements in which that is done by executing appropriate programs using a programmable processing circuit (which may be relatively inefficient, e.g. due to poor memory access locality for execution threads corresponding to different rays). It can also allow the ray tracing acceleration data structure traversals to be performed in parallel (simultaneously) with the programmable execution unit performing other processing.

The effect of this then is that the ray tracing acceleration data structure traversal process (and correspondingly the overall ray tracing rendering process) can be performed more efficiently, thereby facilitating, for example, performing ray tracing and/or improved ray tracing, e.g. on devices whose processing resources may be more limited.

As will be discussed further below, the Applicants have recognised in this regard that a circuit that is dedicated for the purpose of performing a traversal of a ray tracing acceleration data structure can be efficiently provided, e.g., in terms of the silicon area that is required, and that, moreover, the use of such a circuit for performing the traversal of ray tracing acceleration data structures can efficiently and effectively accelerate ray tracing processing, even in the case where the actual intersection of any ray with geometry is not determined by a dedicated circuit (hardware) for that purpose, and particularly in the case where the actual intersection of any geometry by a ray is determined by executing appropriate program instructions using a programmable processing circuit.

Thus, in the technology described herein, rather than providing and offloading the entire ray traversal and intersection operation, including the determination of the intersection of any geometry by a ray, to a circuit (hardware) that is dedicated for that purpose, the technology described herein, as discussed above, uses a dedicated circuit (hardware) for the ray tracing acceleration data structure traversal operation only, but still performs the actual ray intersection determination by means of executing appropriate program instructions using a programmable processing circuit.

The Applicants have found that this then has the advantage of being able to accelerate the ray tracing process as compared, e.g., to performing the entirety of that operation using more general programmable processing circuitry, but on the other hand with a relatively minimal increased cost for the graphics processor, e.g. in terms of the silicon area, as compared, e.g., to providing dedicated circuitry for accelerating the entirety of the ray tracing process.

The graphics processor can comprise any suitable and desired graphics processor that includes a programmable execution unit (circuit).

The programmable execution unit can be any suitable and desired programmable execution unit (circuit) that a graphics processor may contain. It should be operable to execute graphics shading programs to perform graphics processing operations. Thus the programmable execution unit will receive graphics threads to be executed, and execute appropriate graphics shading programs for those threads to generate the desired graphics output.

There may be a single or plural programmable execution units. Where there are plural programmable execution units, each execution unit can in an embodiment operate in the manner of the technology described herein.

The ray tracing acceleration data structure traversal circuit of the graphics processor should be, and is in an embodiment, a (substantially) fixed-function hardware unit (circuit) that is configured to perform a traversal of a ray tracing acceleration data structure to determine geometry for a scene to be rendered that may be intersected by a ray being used for a ray tracing operation. The ray tracing acceleration data structure traversal circuit should thus comprise an appropriate fixed function circuit or circuits to perform the required operations, although it may comprise and have some limited form of configurability, in use, e.g. if desired.

There may be a single or plural ray tracing acceleration data structure traversal circuits, e.g. such that plural programmable execution units share a given (or a single) ray tracing acceleration data structure traversal circuit, and/or such that a given programmable execution unit has access to and can communicate with and use plural different ray tracing acceleration data structure traversal circuits. Where there are plural ray tracing acceleration data structure traversal circuits, each such circuit can in an embodiment operate in the manner of the technology described herein.

The ray tracing acceleration data structure traversal circuit can be configured to perform the ray tracing acceleration data structure traversal in any suitable and desired manner, e.g., and in an embodiment, in dependence upon the form of ray tracing acceleration data structure or structures that could be or will be used.

In an embodiment, the ray tracing acceleration data structure traversal circuit is configured to traverse a ray tracing acceleration data structure in a similar manner to a page table walk in a memory management unit (MMU). Thus, in an embodiment, the ray tracing acceleration data structure traversal circuit has a ray tracing acceleration data structure traversing (walking) state machine, a memory interface, and can cache partial and full ray tracing acceleration data structure traverses (walks), and ray tracing acceleration data structure entries.

The Applicants have recognised in this regard that the traversal of a ray tracing acceleration data structure can be performed in a similar way to a memory page table walk, such that an accelerator circuit that is configured in a similar manner to circuits for a memory page table walk can be efficiently used to traverse a ray tracing acceleration data structure when performing ray tracing.

In an embodiment, the ray tracing acceleration data structure traversal circuit is configured to and operable to perform a plurality of acceleration data structure traverses (for a plurality of different rays) in parallel (and simultaneously).

As discussed above, the ray tracing acceleration data structure traversal circuit is configured to perform a traversal of a ray tracing acceleration data structure to determine geometry that may be intersected by a ray, but does not perform any actual intersection of the geometry with the ray itself (so the ray tracing acceleration data structure traversal circuit does not determine the intersection itself, but rather traverses the ray tracing acceleration data structure to determine geometry that a ray should be intersection-tested against, without performing the intersection test itself).

As well as the ray tracing acceleration data structure traversal circuit, there may also be other accelerators (special purpose units) that are able to communicate with the programmable execution unit, such as a load/store unit (circuit), an arithmetic unit or units (circuit(s)), a texture mapper, etc., if desired.

The communication between the ray tracing acceleration data structure traversal circuit(s), etc., and the programmable execution unit can be facilitated as desired. There is in an embodiment an appropriate communication (messaging) network for passing messages between the various units. This communication (messaging) network can operate according to any desired communications protocol and standard, such as using a suitable interconnect/messaging protocol.

The technology described herein relates to the situation where a frame that represents a view of a scene comprising one or more objects is being rendered using a ray tracing process. In this process, the frame that is being rendered will, and in an embodiment does, comprise an array of sampling positions, and a ray tracing process will be used to render each of the sampling positions so as to provide an output frame (an image) that represents the desired view of the scene (with respective rays that are cast corresponding to and being used when rendering and to render respective sampling positions for the frame).

The technology described herein can be used for any form of ray tracing based rendering.

Thus, for example, the technology described herein can be used for and when a "full" ray tracing process is being used to render a scene, i.e. in which so-called "primary" rays are cast from a view point (the camera) through a sampling position in the image frame to determine the intersection of that ray with objects in the scene, e.g., and in an embodiment, to determine, for each ray, a closest object in a scene that the ray intersects (a "first intersection point" of the ray). The process may involve casting further (secondary) rays from the respective first intersection points of primary rays with objects in the scene, and additionally using the intersection data for the secondary rays in determining the rendering of the sampling positions.

In this case, the operation in the manner of the technology described herein may be, and is in an embodiment, used when and for analysing the intersections of both primary and secondary rays with objects in the scene.

The technology described herein can also be used for so-called "hybrid" ray tracing rendering processes, e.g. in which both ray tracing and rasterisation processes are performed when performing rendering (e.g. in which only some of the steps of a full ray tracing process are performed, with a rasterisation process or processes being used to implement other steps of the "full" ray tracing process). For example, in an exemplary hybrid ray tracing process, the first intersection of each of the primary rays with objects in the scene may be determined using a rasterisation process, but with the casting of one or more further (secondary) rays from the determined respective first intersection points of primary rays with objects in the scene then being performed using a ray tracing process. In this case, the operation in the manner of the technology described herein may be, and is in an embodiment, used when and for analysing the intersections of the secondary rays with objects in the scene.

The ray-tracing based rendering of a frame that is performed in the technology described herein is triggered and performed by the programmable execution unit of the graphics processor executing a graphics processing program that will cause (and that causes) the programmable execution unit to perform the necessary ray tracing rendering process.

Thus, a graphics shader program or programs, including a set (sequence) of program instructions that when executed will perform the desired ray tracing rendering process, will be issued to the graphics processor and executed by the programmable execution unit. The shader program(s) may include only instructions necessary for performing the particular ray tracing based rendering operations, or it may also include other instructions, e.g. to perform other shading operations, if desired.

Subject to the particular operation in the manner of the technology described herein, the execution of the shader program to perform the desired ray tracing process can otherwise be performed in any suitable and desired manner, such as, and in an embodiment, in accordance with the execution of shader programs in the graphics processor and graphics processing system in question.

Thus, the graphics processor (the programmable execution unit of the graphics processor) will operate to execute the shader program(s) that includes a sequence of instructions to perform the desired ray tracing rendering process, for plural, and in an embodiment for each, sampling position, of the frame that is to be rendered.

Correspondingly, when executing the ray tracing shader program, the graphics processor will operate to spawn (issue) respective execution threads for the sampling positions of the frame being rendered, with each thread then executing the program(s) so as to render the sampling position that the thread represents (and corresponds to). The graphics processor accordingly in an embodiment comprises a thread spawner (a thread spawning circuit) operable to, and configured to, spawn (issue) execution threads for execution by the programmable execution unit.

The ray tracing rendering shader program(s) that is executed by the programmable execution unit can be prepared and generated in any suitable and desired manner.

In an embodiment, it or they is generated by a compiler (the shader compiler) for the graphics processor of the graphics processing system in question (and thus the processing circuit that generates the shading program in an embodiment comprises an appropriate compiler circuit). The compiler is in an embodiment executed on an appropriate programmable processing circuit of the graphics processing system.

The compiler (the compiler processing circuit) is in an embodiment part of, and in an embodiment executes on, a central processing unit (CPU), such as a host processor, of the graphics processing system, and is in an embodiment part of a driver for the graphics processor that is executing on the CPU (e.g. host processor).

In this case, the compiler and compiled code will run on separate processors within the overall graphics processing system. However, other arrangements would be possible, such as the compiler running on the same processor as the compiled code, if desired.

The compilation process (the compiler) can generate the ray tracing rendering shader program in any suitable and desired manner, e.g., and in an embodiment, using any suitable and desired compiler techniques for that purpose.

Other arrangements would, of course, be possible.

When executing the shader program to perform the ray tracing based rendering process, as it is a ray tracing-based rendering process, the performance of that process will include the tracing of rays into and through the scene being rendered, e.g., and in an embodiment, so as to determine how a given sampling position that the ray or rays in question correspond to should be rendered to display the required view of the scene at that sampling position.

In the technology described herein, when the tracing (casting) of a ray to the scene being rendered is required as part of the ray tracing rendering process, the programmable execution unit triggers the ray tracing acceleration data structure traversal circuit to traverse a ray tracing acceleration data structure for the ray in question.

As discussed above, depending upon the ray tracing rendering process being used (and the stage of the ray tracing rendering process that has been reached for a given sampling position), the ray that is being cast could comprise a primary ray (e.g. from a viewpoint through a sampling position in an image plane into the scene), or a further (secondary) ray, e.g. that has been cast from a determined intersection with geometry by a primary ray, e.g., and in an embodiment, to determine lighting/shadowing and/or reflections, etc. The operation in the manner of the technology described herein is applicable whatever form of ray is being cast.

When the programmable execution unit requires the ray tracing acceleration data structure traversal circuit to traverse a ray tracing acceleration data structure for a ray, the programmable execution unit sends a message to that effect to the ray tracing acceleration data structure traversal circuit.

The message that is sent from the programmable execution unit to the ray tracing acceleration data structure traversal circuit should, and in an embodiment does, contain information that is required to perform the relevant ray tracing acceleration data structure traversal operation. Thus it in an embodiment indicates one or more of, and in an embodiment all of: the ray tracing acceleration data structure that is to be traversed; the origin (originating position (e.g. x, y, z coordinates)) for the ray that is to be tested (for which the traversal of the ray tracing acceleration data structure is to be determined); the direction of (a direction vector for) the ray that is to traverse the ray tracing acceleration data structure; and the range (distance) that the ray is to traverse (the (minimum and/or maximum) distance the ray is to traverse into the scene).

At least in the case where the graphics processor includes plural programmable execution units, the message in an embodiment also indicates the sender of the message (i.e. which programmable execution unit has sent the message), so that the result of the ray tracing acceleration data structure traversal operation can be returned to the correct programmable execution unit.

The sending of such a message to the ray tracing acceleration data structure traversal circuit by the programmable execution unit can be implemented and triggered in any desired and suitable manner. In an embodiment, this is achieved by including an appropriate instruction in the ray tracing rendering shader program to be executed by the programmable execution unit that will trigger the execution unit to send an appropriate message to the ray tracing acceleration data structure traversal circuit (with the execution unit then sending the message when it reaches (executes) the relevant instruction in the shader program).

Thus, in an embodiment, the method of the technology described herein comprises (and the graphics processing system is correspondingly configured to):

issuing to the programmable execution unit of the graphics processor a shader program for execution by the programmable execution unit that includes an instruction to cause the programmable execution unit to issue a message to the ray tracing acceleration data structure traversal circuit to cause the ray tracing acceleration data structure traversal circuit to perform a traversal of a ray tracing acceleration data structure for a scene for a ray to determine geometry for the scene that may be intersected by the ray; and the programmable execution unit when executing the shader program, when it reaches the instruction in the shader program, issuing a message to the ray tracing acceleration data structure traversal circuit to cause the ray tracing acceleration data structure traversal circuit to perform a traversal of a ray tracing acceleration data structure for a scene for a ray to determine geometry for the scene that may be intersected by the ray.

Such an instruction can be included in a shader program to be executed by the programmable execution unit in any suitable and desired manner and by any suitable and desired element of the overall data (graphics) processing system.

In an embodiment, the "ray traversal" instruction is included in the shader program by the compiler (the shader compiler) for the graphics processor. Thus the compiler in an embodiment inserts a "ray traversal" instruction at the appropriate point in the ray tracing rendering shader program that is performing the ray tracing.

In an embodiment, a "ray traversal" instruction is included in the ray tracing rendering shader program that is to be executed by the graphics processor by the compiler in response to an appropriate ray tracing indication (e.g. a "trace( )" call), included in the (high level) shader program that is provided by the application that requires the graphics processing. Thus, e.g., and in an embodiment, an application program will be able to include an explicit indication of a need for a ray tracing operation, with the compiler then, in the technology described herein, including an appropriate "ray traversal" instruction in the compiled shader program in response to that. It may also be possible for the compiler to include a "ray traversal" instruction of its own accord, e.g. in the case where the compiler is able to assess the shader program being compiled to identify when and where to include a "ray traversal" instruction or instructions, even in the absence of an explicit indication of that.

In an embodiment, the compiler analyses the shader program code that is provided, e.g. by the application on the host processor that requires the graphics processing, and includes a ray traversal instruction or instructions at the appropriate point(s) in the shader program (e.g. by inserting the instruction(s) in the (compiled) shader program).

The technology described herein also extends to and includes such operation of a compiler.

Thus, a further embodiment of the technology described herein comprises a method of compiling a shader program to be executed by a programmable execution unit of a graphics processor that is operable to execute graphics processing programs to perform graphics processing operations;

the method comprising:
including in a shader program to be executed by a programmable execution unit of a graphics processor when rendering a frame that represents a view of a scene comprising one or more objects using a ray tracing process:
an instruction that when executed will cause the programmable execution unit to issue a message to a ray tracing acceleration data structure traversal circuit of the graphics processor that is operable to perform a traversal of a ray tracing acceleration data structure indicative of the distribution of geometry for a scene to be rendered to determine geometry for a scene to be rendered that may be intersected by a ray being used for a ray tracing operation, to cause the ray tracing acceleration data structure traversal circuit to perform a traversal of a ray tracing acceleration data structure for a scene for a ray to determine geometry for the scene that may be intersected by the ray.

A further embodiment of the technology described herein comprises a compiler for compiling a shader program to be executed by a programmable execution unit of a graphics processor that is operable to execute graphics processing programs to perform graphics processing operations;

the compiler comprising a processing circuit configured to:
include in a shader program to be executed by a programmable execution unit of a graphics processor when rendering a frame that represents a view of a scene comprising one or more objects using a ray tracing process:
an instruction that when executed will cause the programmable execution unit to issue a message to a ray tracing acceleration data structure traversal circuit of the graphics processor that is operable to perform a traversal of a ray tracing acceleration data structure indicative of the distribution of geometry for a scene to be rendered to determine geometry for a scene to be rendered that may be intersected by a ray being used for a ray tracing operation, to cause the ray tracing acceleration data structure traversal circuit to perform a traversal of a ray tracing acceleration data structure for a scene for a ray to determine geometry for the scene that may be intersected by the ray.

As will be appreciated by those skilled in the art, these embodiments of the technology described herein can, and in an embodiment do, include any one or more or all of the features of the technology described herein described herein, as appropriate.

In response to a "ray traversal" message from the programmable execution unit, the ray tracing acceleration data structure traversal circuit will perform a traversal of a ray tracing acceleration data structure for the ray indicated by the message.

The ray tracing acceleration data structures that are used and traversed in the technology described herein can be any suitable and desired ray tracing acceleration data structures that are indicative of (that represent) the distribution of geometry for a scene to be rendered and that can be used (and traversed) to determine geometry for a scene to be rendered that may be intersected by a ray being projected into the scene.

The ray tracing acceleration data structure in an embodiment represents (a plurality of) respective volumes within the scene being rendered and indicates and/or can be used to determine geometry for the scene to be rendered that is present in those volumes.

The ray tracing acceleration data structure(s) can take any suitable and desired form, such as comprising a tree structure, such as a bounding volume hierarchy (BVH) tree. The bounding volumes may be axis aligned (cuboid) volumes.

In one embodiment, the ray tracing acceleration data structure comprises a bounding volume hierarchy, and in an embodiment a BVH tree. However, other forms of acceleration data structure, such as a KD tree, voxels (grid hierarchies), etc., could be used, if desired.

The ray tracing acceleration data structure that is traversed can be generated and provided in any suitable and desired manner. For example, it may be previously determined and provided, e.g., as part of the definition of the scene to be rendered by the application that requires the graphics processing.

In an embodiment, the ray tracing acceleration data structure is generated by the graphics processor itself, e.g. based on an indication of geometry for the scene that is provided to the graphics processor, e.g. in a preliminary processing pass before the scene is rendered. In this case, the graphics processor can generate the ray tracing acceleration data structure in any suitable and desired manner, for example by testing geometry defined for the scene against respective bounding volumes, so as to determine the distribution of the geometry in a bounding volume hierarchy for the scene.

It could also or instead be generated by a CPU (e.g. host processor), e.g. based on an indication of geometry for the scene, e.g. in a preliminary processing pass before the scene is rendered.

Other arrangements would, of course, be possible.

The ray tracing acceleration data structure can represent and be indicative of the distribution of geometry for a scene to be rendered in any suitable and desired manner. Thus it may represent the geometry in terms of individual graphics primitives, or sets of graphics primitives, e.g. such that each leaf node of the tree structure represents a corresponding subset of the graphics primitives defined for the scene that occupies the volume that the leaf node corresponds to. Additionally or alternatively, the ray tracing acceleration data structure could represent the geometry for the scene in the form of higher level representations (descriptions) of the geometry, for example in terms of models or objects comprising plural primitives.

It would also be possible for a given ray tracing acceleration data structure to represent the geometry in terms of indicating further ray tracing acceleration data structures that need to be analysed. In this case, an initial ray tracing acceleration data structure would, for example, represent further, e.g. finer resolution, ray tracing acceleration data structures that need to be considered for different volumes of the scene, with the traversal of the initial ray tracing acceleration data structure then determining a further ray tracing acceleration data structure or structures that need to be traversed depending upon which volumes for the scene the ray in question intersects.

Thus the ray tracing traversal operation could include transitions between different ray tracing acceleration data structures, such as transitions between different levels of detail (LOD), and/or between different levels of multi-level ray tracing acceleration data structures.

There may also be ray transformations between ray tracing acceleration data structure switches (e.g. such that there is an automatic transition between different ray tracing acceleration data structures with and/or using a transformation of the ray, e.g. described by metadata of or associated with the ray tracing acceleration data structure). For example, a transition between different levels of detail could use an identity transform, and transitions between multi-level ray tracing acceleration data structures could use generic affine transformations of the rays.

Other arrangements would, of course, be possible.

In response to the message, the ray tracing acceleration data structure traversal circuit will traverse the appropriate, e.g. indicated, ray tracing acceleration data structure(s) to determine geometry for the scene to be rendered that may be intersected by the ray in question.

The ray tracing acceleration data structure traversal circuit can traverse the ray tracing acceleration data structure(s) for a ray in any suitable and desired manner, e.g., and in an embodiment in dependence upon the form of the ray tracing acceleration data structure that is being traversed. The traversal operation will use the information provided about the ray to traverse the ray tracing acceleration data structure to determine geometry for the scene to be rendered that may be intersected by the ray in question. In an embodiment, the ray tracing acceleration data structure traversal circuit traverses and uses the ray tracing acceleration data structure to identify geometry (if any) in volumes of the scene (and that is indicated by the ray tracing acceleration data structure) that the ray passes through.

Thus, the traversal process in an embodiment operates to traverse the ray tracing acceleration data structure to determine for each volume of the scene that the ray passes through in turn, whether there is any geometry in the volume (indicated by the ray tracing acceleration data structure). Thus, the ray tracing acceleration data structure will be traversed based on the position and direction of the ray, to determine whether there is any geometry in the volumes of the scene along the path of the ray (which could, accordingly, then potentially be intersected by the ray). Other arrangements would, of course, be possible.

In an embodiment, the traversal operation traverses the ray tracing acceleration data structure for the path of the ray until a first (potential) intersection with geometry defined for the scene is found for the ray. However, it would also be possible to continue traversal of the ray tracing acceleration data structure after a first (potential) intersection has been found for a ray, if desired.

For example, the ray traversal operation could be (and in an embodiment is) configured and able to discard (ignore) a (potential) intersection and to carry on with the traversal, e.g. depending upon the properties of the geometry for the intersection in question. For example, if a (potentially)

intersected geometry is fully or partially transparent, it may be desirable to continue with the traversal (and either discard or retain the initial "transparent" intersection).

Other arrangements would, of course, be possible.

The ray tracing acceleration data structure traversal for a ray could comprise traversing a single ray tracing acceleration data structure for the ray, or traversing plural ray tracing acceleration data structures for the ray. Thus, in an embodiment the ray tracing acceleration data structure traversal operation for a ray comprises traversing plural ray tracing acceleration data structures for the ray, to thereby determine geometry for the scene to be rendered that may be intersected by the ray.

Plural ray tracing acceleration data structures may be traversed for a ray e.g. in the case where the overall volume of, and/or geometry for, the scene is represented by plural different ray tracing acceleration data structures.

Similarly, as discussed above, in one embodiment, a ray tracing acceleration data structure that indicates further ray tracing acceleration data structures to be traversed is used. In this case therefore the ray tracing acceleration data structure traversal circuit will operate to first traverse an initial ray tracing acceleration data structure for the ray to determine one or more further ray tracing acceleration data structures to be traversed for the ray, and to then traverse those determined one or more ray tracing acceleration data structures for the ray, and so on, until an "end" ray tracing acceleration data structure or structures that provides an indication of geometry for the scene to be rendered is traversed for the ray.

In an embodiment, in the case where plural acceleration data structures are to be traversed, that is in an embodiment triggered and performed by the ray tracing acceleration data structure traversal circuit itself (i.e. without any return to the programmable execution unit between ray tracing acceleration data structure transitions). However, it would also be possible for the operation to be achieved in different ways, e.g. with the ray tracing acceleration data structure traversal circuit traversing a first ray tracing acceleration data structure and then returning the result of that to the programmable execution unit, with the programmable execution unit then triggering the traversal of any further ray tracing acceleration data structure that is required, and so on.

Once the ray tracing acceleration data structure traversal operation for a ray has been performed, the ray tracing acceleration data structure traversal circuit will return to the programmable execution unit the result of the ray tracing acceleration data structure traversal for the ray.

In the case that the ray was found to intersect a volume of the scene that contains geometry defined for the scene (thus the traversal operation found that there is geometry defined for the scene that the ray potentially intersects), the result (the indication of geometry for the scene to be rendered that may be intersected by the ray) that is returned to the programmable execution unit should, and in an embodiment does, comprise an indication of the defined geometry in the volume or volumes determined to be intersected by the ray. Thus, in the case where a ray is found to intersect a volume that contains defined geometry, then the ray tracing acceleration data structure traversal circuit should, and in an embodiment does, return to the programmable execution unit an indication of the geometry for the volume in question.

In this case, the indication of geometry for the scene to be rendered that may be intersected by the ray in question can indicate the geometry that could be intersected for the ray in any suitable and desired manner, e.g., and in an embodiment, in dependence upon the format of the ray tracing acceleration data structure that has been traversed. Thus, this could be in the form of a set of one or more primitives (e.g. points, lines or polygons, such as triangles, etc., and/or spheres, cylinders, cones, etc.) that could be intersected by the ray, and/or some form of higher level definition and/or description of geometry that could be intersected by the ray, for example in the form of more general or generic references to geometry, such as higher order representations of geometry for the scene.

The information that is provided for the (potentially) intersected geometry can take any suitable and desired form, e.g., and in an embodiment, in dependence upon the form of the geometry itself. For example, in the case of a set of primitives (as candidates for intersection), the appropriate primitive identifiers and any associated geometry identifier (e.g. to which they belong) could be returned.

In an embodiment position and direction vectors for the ray are also returned by the ray tracing acceleration data structure traversal circuit.

In order to perform the intersection test and any required subsequent processing, the programmable execution unit may, and in an embodiment does, use further information relating to the geometry (e.g. primitives), such as appropriate attributes of the geometry (e.g. primitives), such as their vertex positions, normals, surface type/materials), etc. This may be needed in order to determine the actual intersection (point), and for performing further processing in relation to the sampling position accordingly.

Thus the process in an embodiment uses information regarding the properties of the geometry (e.g. in terms of its surface properties, the surface it belongs to, etc.). This information can be provided in any suitable and desired manner, but in an embodiment indexes/pointers to data structures where the data relating to the properties of the geometry is stored are used.

In an embodiment, these properties (additional attributes) are fetched by the programmable execution unit as appropriate, once an intersection determination has been returned by the ray tracing acceleration data structure traversal circuit (e.g. by, as discussed below, executing further program instructions to fetch the required attributes).

It would also or instead be possible, if desired, for the indication of the geometry for the scene to be rendered that may be intersected by the ray that is returned to the programmable execution unit by the ray tracing acceleration data structure traversal circuit to, as well as indicating the geometry itself, convey and/or indicate such information regarding the properties of the geometry, e.g. in the form of indexes/pointers to data structure(s) where data relating to the properties of the geometry is stored.

In an embodiment, the ray tracing rendering process supports the use of plural different geometry models, e.g., and in an embodiment, in dependence of the distance of the geometry from the viewpoint (camera), and/or from any lighting for the scene, etc., and the ray tracing acceleration data structure traversal circuit returns with the indicated geometry an indication of which one of the different models should be used for the geometry.

The Applicants have recognised that it would also be possible for the traversal for a ray to fail to find any geometry defined for the scene that the ray could potentially intersect, e.g. in the case when none of the volume of the scene that the ray passes through contains any defined geometry for the scene.

In the case that the ray tracing acceleration data structure traversal circuit finds that the ray does not traverse any volume that contains defined geometry for the scene, then the ray tracing acceleration data structure traversal circuit in an embodiment returns an appropriate response in that event. In an embodiment, the ray tracing acceleration data structure traversal circuit returns a response indicating that nothing has been intersected by the ray (that no potential intersection has been found) (i.e. that there has been a "miss").

In an embodiment, in response to such a "miss" response from the ray tracing acceleration data structure traversal circuit, the programmable execution unit performs an appropriate particular, in an embodiment selected, in an embodiment predefined, "default" operation for further processing for the sampling position in question in response to that event. This could comprise, for example, assuming intersection with a bounding volume or skybox or computing a procedural colour for the background, etc. The programmable execution unit will then shade the sampling position accordingly.

Thus, in the case where there was no geometry for the scene that may be intersected by the ray in question, in an embodiment a particular, in an embodiment selected, in an embodiment predefined, "default" processing operation that is, e.g., and in an embodiment, predefined for use in the event that there is no "active" defined geometry for the scene found to potentially be intersected by the ray in question, is performed.

In this case, the "default" processing operation could, e.g., simply comprise using particular, in an embodiment selected, in an embodiment predefined, sampling position data (a "default" colour value) to be used for a sampling position in the event that there is no active geometry intersected by a ray for a sampling position (and in one embodiment, that is what is done).

In an embodiment, the "default" processing operation that is performed where a ray does not intersect any "actively" defined geometry for the scene comprises using particular, in an embodiment selected, in an embodiment predefined, "default" geometry to be used and considered in that event. In this case, the predefined, default geometry in an embodiment indicates at least a default, predefined surface type for the geometry and/or the position for the geometry. The surface type may, e.g., be predefined as a "bounding" surface that bounds the scene and that is to be used for rays that pass through the scene without intersecting any otherwise defined geometry for the scene.

Thus, in an embodiment, the ray tracing acceleration data structure traversal circuit operates to (and is configured to) determine whether any of the volumes in the scene represented by the ray tracing acceleration data structure traversed by the ray contain any geometry for the scene, and in the case where the ray does traverse a volume for the scene that contains geometry defined for the scene, returns to the programmable execution unit an indication of the geometry for the volume in question, but where the ray does not traverse any volume that contains geometry defined for the scene, returns to the programmable execution unit an indication of that (a "miss" event).

The indication of the geometry that may be intersected by the ray that has been determined by the ray tracing acceleration data structure traversal circuit can be returned to the programmable execution unit in any suitable and desired manner. This is in an embodiment done by means of the ray tracing acceleration data structure traversal circuit sending an appropriate message, containing the required geometry information, to the programmable execution unit (and, as will be discussed further below, in an embodiment to an execution thread generator (spawner) for the programmable execution unit). Other arrangements would, of course, be possible.

In an embodiment, the ray tracing acceleration data structure traversal circuit is configured to, and operable to, group rays (traversal requests) that are to traverse the same acceleration data structure together, so as to execute the traversals of the acceleration data structure for the rays of the group of rays together.

In an embodiment, rays that are sufficiently similar to each other and that are to traverse the same acceleration data structure are grouped together, so as to execute the traversals of the acceleration data structure for the rays of the group together. This will help to increase memory locality, and, accordingly, improve the effectiveness of any caching of the ray tracing acceleration data structure (and correspondingly reduce the number of off-chip memory accesses that may be required).

In this case, the rays are in an embodiment grouped together based on their similarities to each other, such that "similar" rays will be grouped together for this purpose. Thus rays are in an embodiment grouped for traversing the (same) ray tracing acceleration data structure together based on one or more particular, in an embodiment selected, in an embodiment predefined criteria, such as one or more of, and in an embodiment all of: the starting positions (origins) for the rays; the directions (direction vectors) of the rays; and the range that the rays are to be cast for.

Thus, in an embodiment, rays can be, and are, grouped together for the ray tracing acceleration data structure traversal process if and when their positions (origins), directions, and/or ranges, are sufficiently similar (e.g., and in an embodiment, are within a particular threshold range or margin of each other) (and the rays are to traverse the same ray tracing acceleration data structure). This will then facilitate performing the ray tracing acceleration data structure traversals for similar rays together, thereby increasing memory access locality, etc., and thus making the ray tracing acceleration data structure traversal operation more efficient.

In order to facilitate this operation, the ray tracing acceleration data structure traversal circuit can in an embodiment maintain a "pool" of rays that are waiting to traverse an acceleration data structure (e.g. in an appropriate queue or buffer (cache) on or accessible to the ray tracing acceleration data structure traversal circuit), and select groups of one or more rays from that pool for processing, e.g., and in an embodiment, based on one or more or all of the criteria discussed above. This will then facilitate the ray tracing acceleration data structure traversal circuit identifying and processing groups of similar rays together.

Thus, the ray tracing acceleration data structure traversal circuit in an embodiment comprises appropriate local storage, such as a queue or cache, for pooling (buffering) rays that are to traverse an acceleration data structure, from which "pool" groups of rays can then be selected for their ray tracing acceleration data structure traversals to be performed together. The ray tracing acceleration data structure traversal circuit correspondingly in an embodiment comprises an appropriate controller operable to select and group rays for which ray tracing acceleration data structure traversals are to be performed from the "pool", and to cause ray tracing acceleration data structure traversals to be performed for groups of rays together.

In this case, rays that are in the "pool" and that are waiting to traverse a ray tracing acceleration data structure in an embodiment have their duration in the pool (their "ages") tracked, with any ray whose duration in the pool exceeds a particular, in an embodiment selected, in an embodiment predetermined, threshold duration ("age"), then being prioritised for processing, e.g., and in an embodiment, without waiting any further for later, "similar" rays to arrive for processing. This will then help to ensure that rays are not retained in the pool for too long whilst waiting for other rays potentially to group with the ray.

The rays in the pool may, for example, be time-stamped for this purpose so that their ages in the pool can be tracked.

Other arrangements would, of course, be possible.

Once a group of rays to be processed together have been selected, then the rays should be processed together as a group.

In the case where the ray tracing acceleration data structure traversal circuit supports processing only one ray at a time, then the group of rays is in an embodiment processed together by the ray tracing acceleration data circuit by the ray tracing acceleration data circuit processing each ray of the group in turn, immediately one after another. (This will still be advantageous, as the necessary ray tracing acceleration data structure data will, e.g., be loaded for the first ray of the group, and then can be reused for subsequent rays in the group, e.g. without the need to load further data or that data again.)

On the other hand, where the ray tracing acceleration data structure traversal circuit can perform traversals for plural rays in parallel (simultaneously), then the traversals for some or all of the rays of the group can be, and are in an embodiment, performed in parallel. In this case, if there are more rays in the group than can be handled in parallel in one processing pass of the ray tracing acceleration data structure traversal circuit, then the rays from the group should be processed as successive subsets of plural rays from the group, with each subset of rays being processed in parallel.

The groups of rays for which the traversals of the ray tracing acceleration data structure are performed together can comprise any suitable and desired (plural) number of rays, although there may, e.g., and in an embodiment, be a particular, in an embodiment selected, in an embodiment defined, maximum number of rays for which the traversals may be performed together, e.g. depending upon the parallel processing capability of the ray tracing acceleration data structure traversal circuit in this regard.

Other arrangements would, of course, be possible.

It would also be possible to group (and, e.g., re-group) rays, e.g. according to the status of the rays during the traversal itself, e.g. in the case that some rays in the initial group may be terminated before others during the traversal itself. In this case, rays may, e.g., be re-grouped as the rays perform the traversal.

Once the ray tracing acceleration data structure traversal circuit has completed its traversal of a ray tracing acceleration data structure or structures for a ray, then it will, as discussed above, return to the programmable execution unit, an indication of geometry that may be intersected by the ray, e.g. including information relating to the properties of the geometry in question. This information can be returned to the programmable execution unit in any suitable and desired manner, such as, and in an embodiment, by means of an appropriate response message from the ray tracing acceleration data structure traversal circuit to the programmable execution unit.

Once the ray tracing acceleration data structure traversal circuit has returned the appropriate geometry information for a ray, the programmable execution unit will then, and does then, use the indicated geometry determined by the ray tracing acceleration data structure traversal circuit to determine any geometry that is intersected by a ray. Thus the programmable execution unit will itself perform the actual intersection tests and determinations using, and based on, the geometry indicated by the ray tracing acceleration data structure traversal circuit.

The intersection determination can use the information returned by the ray tracing acceleration data structure traversal circuit as appropriate and desired. Thus it will, in an embodiment, use the indication of geometry that may be intersected by the ray to test whether the geometry is actually intersected by the ray, together with any other properties, such as surface properties, indicated for the geometry that may affect intersection of the ray or the operation that is required.

It should be noted in this regard that while the programmable execution unit will, and in an embodiment does, use the indicated geometry to determine the geometry that is intersected by a ray, as the ray tracing acceleration data structure traversal circuit only returns an indication of geometry that may be intersected by the ray (e.g. that is present in a volume that the ray intersects (pass into/through), it could be that in fact the ray will not actually intersect any of the indicated geometry. Thus while the determination of any geometry that is intersected by a ray performed by the programmable execution unit may, and typically will, result in the identification of geometry that is actually intersected by the ray, it could be the case that the intersection determination performed by the programmable execution unit will in fact determine that there is in fact no geometry that is intersected by the ray.

In the case that the intersection determination performed by the programmable execution unit determines that there is in fact no geometry that is intersected by the ray (e.g. when the ray tracing acceleration data structure traversal circuit returns a set of primitives, but none of the primitives is actually intersected by the ray), then the programmable execution unit in an embodiment treats that as a ray tracing intersection "miss" (as discussed above for the situation where the ray tracing acceleration data structure traversal circuit does not identify any intersection for a ray), and then performs the appropriate "miss" "default" operation (as discussed above) accordingly.

Once the geometry that the ray will actually intersect (if any) has been determined, then the programmable execution unit performs further processing for the sampling position in the frame that the ray corresponds to in accordance with the (any) geometry for the scene determined to be intersected by the ray.

The further processing for a sampling position that is performed in this regard can comprise any suitable and desired processing for the sampling position as a result of the ray tracing operation for the ray in question, e.g., and in an embodiment, in accordance with and based on any geometry for the scene that was determined to be intersected by the ray.

The further processing for a sampling position that is performed as a result of the ray tracing operation for a ray is in an embodiment determined and selected in accordance with and based on the geometry of the scene that was determined to be intersected by the ray, and/or in accordance with and based on the particular ray tracing-based rendering process that is being performed (e.g. whether the ray tracing process requires the casting of secondary rays (where it is appropriate to do that), and/or the casting of secondary rays of a particular type, or whether the ray tracing-based rendering is intended to be based solely on the first intersection point that is determined). For example, the further processing could be, and in an embodiment is, based on the determined surface type of the geometry that is intersected, and a predefined operation (e.g. in terms of the casting of any secondary rays) for that surface type.

Other arrangements would, of course, be possible.

In an embodiment, the further processing for a sampling position that can be (and is) performed in accordance with any geometry for the scene determined to be intersected by a ray corresponding to the sampling position comprises triggering the casting of a further (e.g. secondary) ray into the scene for the sampling position in question.

In an embodiment, the further processing for a sampling position in the frame that a ray corresponds to that can be (and is) performed in accordance with any geometry for the scene determined to be intersected by the ray also or instead (and in an embodiment also) comprises rendering (shading) the sampling position for the frame to generate an output data value (colour value) for the sampling position, e.g., and in an embodiment, to be used to display the view of the scene at the sampling position for the frame in question.

Thus, in an embodiment, the further processing for a sampling position in a frame that a ray corresponds to that is performed comprises one of:

triggering the tracing (casting) of a further (e.g. secondary) ray for the sampling position in question; and rendering (shading) the sampling position so as to provide an output colour value for the sampling position for the frame.

Correspondingly, the technology described herein in an embodiment comprises shading the sampling position based on the intersection, and/or casting further rays into the scene based on the intersection.

As discussed above, which of these operations is performed is in an embodiment based on and in accordance with a property or properties of the geometry that was determined to be intersected by the ray, and the particular ray tracing-based rendering process that is being used.

In the case that the programmable execution unit, in response to determining that there is geometry that is intersected by a ray (and the geometry that is intersected by a ray), determines that a further ray should be cast into the scene, then the casting of the further ray is in an embodiment done by the programmable execution unit (again) sending an appropriate message to the ray tracing acceleration data structure traversal circuit to then perform the appropriate ray tracing acceleration data structure traversals for the new ray for the sampling position in question.

Thus, in embodiments at least, there may be an iterative process of casting a ray, the ray tracing acceleration data structure traversal circuit traversing a ray tracing acceleration data structure(s) for the ray, the programmable execution unit determining that there is geometry that is intersected by the ray, and then triggering the traversal of a ray tracing acceleration data structure by the ray tracing acceleration data structure traversal circuit for a further ray for the sampling position in question, and so on.

In the case that the programmable execution unit, in response to determining that there is geometry that is intersected by ray (and the geometry that is intersected by a ray), determines that the sampling position that the ray corresponds to should be shaded (rendered) so as to provide an output colour value for the sampling position for the frame, then the programmable execution unit will execute instructions so as to provide an output, colour value for the sampling position in question.

The rendering (shading) of the sampling position can be performed in any suitable and desired manner. In an embodiment, it is performed based on and in accordance with the results of the casting of the ray or rays for the sampling position, and the determined intersected geometry (if any), and/or based on and in accordance with the particular ray tracing-based rendering process that is being performed. For example, the rendering (shading) processing could be, and in an embodiment is, based on the determined surface type of the geometry that is intersected, and a predefined shading operation for that surface type.

The rendering (shading) in an embodiment takes account of all the rays that have been cast for a sampling position and so in an embodiment is based both on the first intersected geometry (and the properties, e.g. surface properties, of that geometry), together with the result of any further (secondary) rays that have been cast for the sampling position, e.g. to determine any lighting, reflection or refraction effects.

Other arrangements would, of course, be possible.

In an embodiment, the rendering (shading) of the sampling position is performed once all of the (desired) rays have been cast for the sampling position (and the geometry intersections (if any) for all of the rays to be cast for the sampling position in question have been determined). (As discussed above, the ray tracing process for a given sampling position may comprise both the determination of any geometry that is intersected by a "primary" ray that has been cast from the sampling position itself, together with the determination of geometry, etc., for any secondary rays that have been cast for the sampling position in question, e.g. as a result of an intersection or intersections determined for the primary ray.)

Thus, in an embodiment, once the final results of the rays (the geometry intersections (if any)) have been determined for a sampling position, the programmable execution unit will then render the sampling position in the frame, (at least) in accordance with any geometry for the scene determined to be intersected by rays that have been cast for the sampling position.

Again, this can be done in any suitable and desired manner, and can use any suitable and desired properties, etc., of the geometry, etc., that is determined to be intersected by a ray or rays for the sampling position.

The programmable execution unit can perform and be triggered to perform the determination of any geometry intersected by a ray, and then the appropriate further processing for the sampling position accordingly, in response to the result of a ray tracing acceleration data structure traversal from the ray tracing acceleration data structure traversal circuit, in any suitable and desired manner. In an embodiment, the programmable execution unit performs these operations, and is triggered to perform these operations, by executing, and being triggered to execute, further processing instructions that will cause the programmable execution unit to perform the required processing operations.

Thus, in an embodiment, once an indication from the ray tracing acceleration data structure traversal circuit of geometry that may be intersected by a ray is available, the programmable execution unit is caused to execute further processing instructions, e.g., and in an embodiment, that will cause the programmable execution unit to perform the required processing operations, including determining any geometry intersected by the ray, and then the appropriate further processing for the sampling position in accordance with any geometry for the scene determined to be intersected by the ray.

Thus, when a response from the ray tracing acceleration data structure traversal circuit is available, the programmable execution unit will execute further shader program instructions to perform the desired geometry intersection determination and consequent further processing for the sampling position in question.

In an embodiment, there are different sets of further instructions to be executed in dependence upon the type of geometry that has been determined and is indicated by the ray tracing acceleration data structure, as (potentially) being intersected by a ray. Thus, in an embodiment, there are different (sets) (sequences) of instructions that will be executed by the programmable execution unit in accordance with, and in dependence upon, the particular geometry, and in an embodiment the particular surface type (surface property or properties) of the geometry, indicated by the ray tracing acceleration data structure traversal circuit.

The different sets of instructions to be executed for different types of geometry (e.g. surfaces) could, e.g., be provided as a set of plural different shader programs to be executed (in dependence upon the indicated geometry) (and in one embodiment that is the case), or they could be different sequences (sets) of instructions (e.g. sub-routines) within an overall, larger, shader program that includes sequences (sets) of instructions for each of the different geometry types that are to be treated differently to each other.

Thus, there are in an embodiment a plurality of different "surface processing" routines (shader programs) that will be selected from for execution by the programmable execution unit in accordance with, and based on, the indicated geometry that may be intersected by a ray returned by the ray tracing acceleration data structure traversal circuit.

Thus, in an embodiment, the operation in the manner of the technology described herein comprises, and the graphics processor (e.g. the programmable execution unit) is configured to, in response to an indication of geometry that may be intersected by a ray from the ray tracing acceleration data structure traversal circuit, selecting a sequence of instructions (e.g. a shader program) to be executed by the programmable execution unit to cause the programmable execution unit to determine any geometry that is intersected by a ray and perform further processing for the sampling position that the ray corresponds to, in dependence upon a property or properties, and in an embodiment a surface type, of the indicated geometry returned by the ray tracing acceleration data structure traversal circuit (with the programmable execution unit then executing the sequence of instructions (e.g. shader program) to use the indicated geometry determined by the ray tracing acceleration data structure traversal circuit to determine any geometry that is intersected by a ray and then perform further processing for the sampling position that the ray corresponds to, accordingly).

As the programmable execution unit continues its processing (for a sampling position) when it receives a response from the ray tracing acceleration data structure traversal circuit by executing further shader program instructions, it would be possible in this regard for the further program instructions to be executed by the original (the originating) execution thread that triggered the message to, and the operation of, the ray tracing acceleration data traversal circuit for the ray and sampling position in question.

In this case therefore, an initial thread, e.g. for a sampling position in the frame, will execute an initial sequence of instructions for the ray tracing rendering process that will, as part of that operation, trigger a message to the ray tracing acceleration data structure traversal circuit to perform a ray tracing acceleration data structure traversal for a ray, with the thread that is executing the program then, e.g., being stalled when and while the ray tracing acceleration data structure traversal is required, until the result of the ray tracing acceleration data structure traversal is returned by the ray tracing acceleration data structure traversal circuit, with the (original) thread then resuming execution of shader program instructions at that point to execute the instructions that perform the ray intersection determination and any consequent further processing for the sampling position, etc.

However, in an embodiment, a new execution thread is generated (spawned) and used to execute (and to trigger the execution of) the necessary program instructions once the ray tracing acceleration data structure traversal circuit has returned an indication of geometry that may be intersected by a ray.

Thus, in this case, a first thread will execute the program instructions to perform the ray tracing-based rendering process up and until a message is sent to the ray tracing acceleration data structure traversal circuit for it to perform a ray tracing acceleration data structure traversal for a ray, with that initial thread then being retired at that point.

Then, when the result of the ray tracing acceleration data structure traversal is available from the ray tracing acceleration data structure traversal circuit, a new thread will be generated (spawned), and execute the relevant sequence of instructions (e.g. shader program) to perform the necessary ray intersection determination and the further processing for the sampling position in question in response to the result of the ray intersection determination.

In this case, the new thread should be, and is in an embodiment, generated (spawned) in accordance with the information returned by the ray tracing acceleration data structure traversal circuit, thus in accordance with, and based on, the indicated surface type, position and/or distance vectors, etc.

To facilitate this operation, in an embodiment, the ray tracing acceleration data structure traversal circuit in an embodiment comprises, and/or is in communication with, an appropriate thread spawner (thread generating circuit), so that it can trigger the generation of new execution threads to be executed by the programmable execution unit when, and in response to, the ray tracing acceleration data structure traversal circuit completing the traversal of a ray tracing acceleration data structure for a ray.

Thus, in an embodiment, the ray tracing acceleration data structure traversal circuit returns an indication of geometry that may be intersected by a ray to the programmable execution unit by triggering the generation of an execution thread that will perform further processing in accordance with the determined result of the ray tracing acceleration data structure traversal for execution by the programmable execution unit (and providing for, and/or associating with that thread, the relevant geometry information), and in an embodiment does this by sending an appropriate message including the necessary geometry indication to a thread generator (spawner) that is operable to and configured to then generate an execution thread for execution by the programmable execution unit accordingly.

Other arrangements would, of course, be possible.

As discussed above, in an embodiment of the technology described herein at least, different sets of "surface processing" program instructions (e.g. different shader programs) will be executed in dependence upon the geometry, and in particular a property or properties (and in an embodiment a surface property and/or type) of the geometry found to be intersected by a ray.

In view of this, in an embodiment, the programmable execution unit can be, and is in an embodiment, caused to execute a given particular set of "surface processing"

instructions (shader program) for plural "returned rays" together (i.e. in parallel and/or one after another). This will then have the effect of helping to increase shader instructions/shader program and/or shader program data locality, and make the shader program execution more efficient.

Thus, in an embodiment, there are plural different sets of "surface processing" program instructions (different shader programs) to be executed for different types of geometry (e.g.), and in an embodiment for different geometry surface types, and the further processing for sampling positions in response to the results of ray traversals returned by the ray tracing acceleration data structure traversal circuit can be, and is in an embodiment, grouped together based on the particular set of instructions (e.g. shader program) that is to be executed to continue the processing for the sampling positions based on the results of the ray traversal.

Thus, in an embodiment, ray intersection determinations that are to be performed to continue the processing of sampling positions when ray traversal results are available, are grouped together for execution by the programmable execution unit (at least) based on the geometry type, and in an embodiment the surface type, that the corresponding ray was found to intersect.

Thus, ray intersection determinations are in an embodiment grouped for execution together based on one or more particular, in an embodiment selected, in an embodiment predefined criteria, such as one or more of, and in an embodiment all of: the surface type for the geometry to be processed for the rays; the positions for the rays; and the directions (direction vectors) of the rays.

Thus, in an embodiment, ray intersection determinations can be, and are, grouped together for the "surface processing" shader program execution if and when their (potentially) intersected geometry, positions (origins), and/or directions, are sufficiently similar (e.g., and in an embodiment, such that the ray intersection determinations will use the same "surface processing" shader program (sets of instructions).

In order to facilitate this operation, a "pool" of ray intersection determinations that are waiting to "execute" "surface processing" instructions (programs) is maintained (e.g. in an appropriate queue or buffer (cache) associated with the ray tracing acceleration data structure traversal circuit), with groups of one or more ray intersection determinations then being selected from that pool for processing, e.g., and in an embodiment, based on one or more or all of the criteria discussed above. This will then facilitate identifying and executing ray intersection determinations that are to execute the same "surface processing" program together.

Thus, the ray tracing acceleration data structure traversal circuit in an embodiment comprises appropriate local storage, such as a queue or cache, for pooling (buffering) ray intersection determinations for which "surface processing" instructions (programs) using responses received from the ray tracing acceleration data structure traversal circuit are to be executed, from which "pool" groups of ray intersection determinations can then be selected for their shader program execution to be performed together. The ray tracing acceleration data structure traversal circuit correspondingly and in an embodiment comprises an appropriate controller operable to select and group ray intersection determinations for which "surface processing" programs are to be executed from the "pool", and to cause same "surface processing" program to be executed for a group of ray intersection determinations together.

In this case, ray intersection determinations that are in the "pool" and that are waiting to execute a "surface processing" shader program in an embodiment have their duration in the pool (their "ages") tracked, with any ray intersection determinations whose duration in the pool exceeds a particular, in an embodiment selected, in an embodiment predetermined, threshold duration ("age"), then being prioritised for execution, e.g., and in an embodiment, without waiting any further for later, "similar" ray intersection determinations to arrive for processing. This will then help to ensure that ray intersection determinations are not retained in the pool for too long whilst waiting for other ray intersection determinations potentially to group with the ray intersection determinations.

The ray intersection determinations in the pool may, for example, be time-stamped for this purpose so that their ages in the pool can be tracked.

Other arrangements would, of course, be possible.

Once a group of ray intersection determinations to be executed together have been selected, then the programmable execution unit should be triggered to execute the "surface processing" shader program for the group of ray intersection determinations together as a group. This can be done in any suitable and desired manner.

In an embodiment this is done by triggering the generation (spawning) of a corresponding group of execution threads, and issuing those threads to execute the "surface processing" shader program accordingly. This is in an embodiment done by submitting the selected group of ray intersection determinations to a thread generator (spawner), to then trigger the generation of the required corresponding group of execution threads for execution.

The threads of the group of execution threads will then be triggered to, and will execute, the "surface processing" shader program together as a group.

In the case where the programmable execution unit supports executing only one thread at a time, then the group of threads is in an embodiment executed together by the programmable execution unit by the programmable execution unit executing each thread of the group in turn, immediately one after another.

On the other hand, where the programmable execution unit can execute for plural threads in parallel (simultaneously), then the executions for some or all of the threads of the group can be, and are in an embodiment, performed in parallel. In this case, if there are more threads in the group than can be handled in parallel in one processing pass of the programmable execution unit, then the threads from the group should be processed as successive subsets of plural threads from the group, with each subset of threads being executed in parallel.

The groups of ray intersection determinations for which the shader program execution is performed together can comprise any suitable and desired (plural) number of ray intersection determinations, although there may, e.g., and in an embodiment, be a particular, in an embodiment selected, in an embodiment defined, maximum number of ray intersection determinations for which the execution may be performed together, e.g. depending upon the parallel processing capability of the programmable execution unit in this regard.

In an embodiment, the pooling and subsequent grouping of ray intersection determinations that are to be performed is used to control and select the pre-fetching of "surface processing" shader programs (instructions) to be executed and/or of data (data structures), such as graphics textures, to be used, when performing the ray intersection determinations for a given group of ray intersection determinations, e.g., and in an embodiment, into local storage, e.g. a cache or caches, of or accessible to the programmable execution unit. For example, the relevant "surface processing" shader programs (instructions) to be executed and/or data (data structures), such as graphics textures, to be used, for a group of ray intersection determinations may be pre-fetched (pre-loaded), before the threads for the group of ray intersection determinations are generated and issued to perform the ray intersection determinations for the group. This may again help to improve the efficiency of the process.

Other arrangements would, of course, be possible.

Once the ray tracing based rendering process has been completed for a sampling position, then that will, and in an embodiment does, as discussed above, generate an appropriate set of output data for the sampling position, e.g., and in an embodiment, in the form of an appropriate set of colour (e.g. RGB) data, for the sampling position.

This will be done for each sampling position in the frame (thus the operation in the manner of the technology described herein is in an embodiment performed for plural, and in an embodiment for each, sampling position of the frame being rendered), so that a final output frame showing a view of the scene to be rendered will be generated, which output frame can then, e.g., be written out to memory and/or otherwise processed for further use, e.g. for display on a suitable display.

The process may then be repeated for a next frame (e.g. the next frame to be displayed), and so on.

The technology described herein can be used for all forms of output that a graphics processor may output. Thus, it may be used when generating frames for display, for render-to-texture outputs, etc. The output from the graphics processor is, in an embodiment, exported to external, e.g. main, memory, for storage and use.

Subject to the requirements for operation in the manner of the technology described herein, the graphics processor can otherwise have any suitable and desired form or configuration of graphics processor and comprise and execute any other suitable and desired processing elements, circuits, units and stages that a graphics processor may contain, and execute any suitable and desired form of graphics processing pipeline.

In an embodiment, the graphics processor is part of an overall graphics (data) processing system that includes, e.g., and in an embodiment, a host processor (CPU) that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and, in an embodiment does, also execute a driver for the graphics processor and a compiler or compilers for compiling programs to be executed by the programmable execution unit of the graphics processor.

The overall graphics processing system may, for example, include one or more of: a host processor (central processing unit (CPU)), the graphics processor (processing unit), a display processor, a video processor (codec), a system bus, and a memory controller.

The graphics processor and/or graphics processing system may also comprise, and/or be in communication with, one or more memories and/or memory devices that store the data described herein, and/or the output data generated by the graphics processor, and/or store software (e.g. (shader) programs) for performing the processes described herein. The graphics processor and/or graphics processing system may also be in communication with a display for displaying images based on the data generated by the graphics processor.

As will be appreciated from the above, in a graphics processing system that is operable in the manner of the technology described herein, in embodiments of the technology described herein at least, a compiler, e.g. executing on a host processor, will generate and issue to the graphics processor one or more shader programs that when executed will perform the required ray tracing-based rendering operations in accordance with the technology described herein, with the graphics processor (the programmable execution unit of the graphics processor) then executing the programs to perform the ray tracing-based rendering, and as part of that program execution exchanging the messages discussed above with the ray tracing acceleration data structure traversal circuit of the graphics processor.

The technology described herein also extends to such an overall graphics processing system and the operation of that system.

Thus, another embodiment of the technology described herein comprises a method of operating a graphics processing system, the graphics processing system comprising:
  a graphics processor comprising:
    a programmable execution unit operable to execute graphics processing programs to perform graphics processing operations; and
    a ray tracing acceleration data structure traversal circuit operable to perform a traversal of a ray tracing acceleration data structure indicative of the distribution of geometry for a scene to be rendered to determine geometry for a scene to be rendered that may be intersected by a ray being used for a ray tracing operation;
  wherein:
    the programmable execution unit is operable to communicate with the ray tracing acceleration data structure traversal circuit to cause the ray tracing acceleration data structure to perform a traversal of a ray tracing acceleration data structure for a ray, and to receive responses from the ray tracing data structure traversal circuit indicative of geometry that may be intersected by the ray that has been determined by the ray tracing acceleration data structure traversal circuit;
  the method comprising:
    generating a graphics shader program or programs which, when executed by the programmable execution unit of the graphics processor, causes the graphics processor to render a frame that represents a view of a scene comprising one or more objects using a ray tracing process;
  the generating a graphics shader program or programs which, when executed by the programmable execution unit of the graphics processor, causes the graphics processor to render a frame that represents a view of a scene comprising one or more objects using a ray tracing process comprising:
    including in a shader program to be executed by the programmable execution unit of the graphics processor when rendering a frame that represents a view of a scene comprising one or more objects using a ray tracing process:
      an instruction that when executed will cause the programmable execution unit to issue a message to the ray tracing acceleration data structure traversal circuit of the graphics processor, to cause the ray tracing acceleration data structure traversal circuit to perform a traversal of a ray tracing acceleration data structure for a scene for a ray to determine geometry for the scene that may be intersected by the ray;

providing the generated graphics shader program or programs to the graphics processor for execution by the programmable execution unit; and the programmable execution unit of the graphics processor:

executing the graphics shader program or programs to render a frame that represents a view of a scene comprising one or more objects using a ray tracing process; and when executing the program or programs, in response to the instruction that when executed will cause the programmable execution unit to issue a message to the ray tracing acceleration data structure traversal circuit of the graphics processor, to cause the ray tracing acceleration data structure traversal circuit to perform a traversal of a ray tracing acceleration data structure for a scene for a ray to determine geometry for the scene that may be intersected by the ray:

sending a message to the ray tracing acceleration data structure traversal circuit to perform a traversal of a ray tracing acceleration data structure for the scene to determine geometry for the scene that may be intersected by the ray;

the ray tracing acceleration data structure traversal circuit in response to the message from the programmable execution unit:

performing a traversal of a ray tracing acceleration data structure for the scene for the ray to determine geometry for the scene to be rendered that may be intersected by the ray and returning to the programmable execution unit an indication of geometry that may be intersected by the ray; and the programmable execution unit:

executing further shader program instructions to:

use the indicated geometry determined by the ray tracing acceleration data structure traversal circuit to determine any geometry that is intersected by the ray; and perform further processing for a sampling position in the frame that the ray corresponds to in accordance with any geometry for the scene determined to be intersected by the ray.

Thus, another embodiment of the technology described herein comprises a graphics processing system, the graphics processing system comprising:

a graphics processor comprising:

a programmable execution unit operable to execute graphics processing programs to perform graphics processing operations; and a ray tracing acceleration data structure traversal circuit operable to perform a traversal of a ray tracing acceleration data structure indicative of the distribution of geometry for a scene to be rendered to determine geometry for a scene to be rendered that may be intersected by a ray being used for a ray tracing operation;

wherein:

the programmable execution unit is operable to communicate with the ray tracing acceleration data structure traversal circuit to cause the ray tracing acceleration data structure to perform a traversal of a ray tracing acceleration data structure for a ray, and to receive responses from the ray tracing data structure traversal circuit indicative of geometry that may be intersected by the ray that has been determined by the ray tracing acceleration data structure traversal circuit;

the graphics processing system further comprising:

a processing circuit configured to:

generate a graphics shader program or programs which, when executed by the programmable execution unit of the graphics processor, causes the graphics processor to render a frame that represents a view of a scene comprising one or more objects using a ray tracing process;

the generating a graphics shader program or programs which, when executed by the programmable execution unit of the graphics processor, causes the graphics processor to render a frame that represents a view of a scene comprising one or more objects using a ray tracing process comprising:

including in a shader program to be executed by the programmable execution unit of the graphics processor when rendering a frame that represents a view of a scene comprising one or more objects using a ray tracing process:

an instruction that when executed will cause the programmable execution unit to issue a message to the ray tracing acceleration data structure traversal circuit of the graphics processor, to cause the ray tracing acceleration data structure traversal circuit to perform a traversal of a ray tracing acceleration data structure for a scene for a ray to determine geometry for the scene that may be intersected by the ray; and provide the generated graphics shader program or programs to the graphics processor for execution by the programmable execution unit; and the programmable execution unit of the graphics processor being configured to:

execute the graphics shader program or programs to render a frame that represents a view of a scene comprising one or more objects using a ray tracing process; and when executing the program or programs, in response to the instruction that when executed will cause the programmable execution unit to issue a message to the ray tracing acceleration data structure traversal circuit of the graphics processor, to cause the ray tracing acceleration data structure traversal circuit to perform a traversal of a ray tracing acceleration data structure for a scene for a ray to determine geometry for the scene that may be intersected by the ray:

send a message to the ray tracing acceleration data structure traversal circuit to perform a traversal of a ray tracing acceleration data structure for the scene to determine geometry for the scene that may be intersected by the ray;

the ray tracing acceleration data structure traversal circuit is configured to, in response to the message from the programmable execution unit:

perform a traversal of a ray tracing acceleration data structure for the scene for the ray to determine geometry for the scene to be rendered that may be intersected by the ray and return to the programmable execution unit an indication of geometry that may be intersected by the ray; and the programmable execution unit is configured to:

execute further shader program instructions to:

use the indicated geometry determined by the ray tracing acceleration data structure traversal circuit to determine any geometry that is intersected by the ray; and perform further processing for a sampling position in the frame that the ray corresponds to in accordance with any geometry for the scene determined to be intersected by the ray.

As will be appreciated by those skilled in the art, these embodiments of the technology described herein can, and in an embodiment do, include any one or more or all of the features of the technology described herein described herein.

Thus, for example, the shader program or programs that are provided to the graphics processor for execution (and that are prepared by the compiler) in an embodiment comprise a first sequence of instructions to perform appropriate graphics processing operations for a ray tracing-based rendering process up to and including the instruction that triggers the sending of a message to the ray tracing acceleration data structure traversal circuit to perform a ray tracing acceleration data structure traversal for a ray, together with one or more sequences of instructions to be executed once a response from the ray tracing acceleration data structure has been received (and, in an embodiment, to be executed in dependence upon the response from the ray tracing acceleration data structure, such as the geometry/surface type), which sequences of instructions will, when executed, determine any geometry that is intersected by a ray using the determined indication of the geometry returned by the ray tracing acceleration data structure traversal circuit, and then trigger further processing in respect of a sampling position that the ray corresponds to accordingly (which further processing in an embodiment may be the casting of a further ray, and/or the rendering (shading) of the sampling position that the ray corresponds to).

Other arrangements would, of course, be possible.

It will be appreciated by those skilled in the art that all of the described embodiments of the technology described herein can, and in an embodiment do, include, as appropriate, any one or more or all of the features of the technology described herein described herein.

The technology described herein can be implemented in any suitable system, such as a suitably configured microprocessor based system. In an embodiment, the technology described herein is implemented in a computer and/or micro-processor based system. The technology described herein is in an embodiment implemented in a portable device, such as, and in an embodiment, a mobile phone or tablet.

The various functions of the technology described herein can be carried out in any desired and suitable manner. For example, the functions of the technology described herein can be implemented in hardware or software, as desired. Thus, for example, unless otherwise indicated, the various functional elements, stages, units, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuitry/circuits), and/or programmable hardware elements (processing circuitry/circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages, etc., may share processing circuitry/circuits, etc., if desired.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display processor, or microprocessor system comprising a data processor causes in conjunction with said data processor said controller or system to carry out the steps of the methods of the technology described herein. Such a computer software carrier could be a physical storage intermediate such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory intermediate, such as a computer readable intermediate, for example, diskette, CD ROM, ROM, RAM, flash memory, or hard disk. It could also comprise a series of computer readable instructions transmittable to a computer system, via a modem or other interface device, over either a tangible intermediate, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable intermediate with accompanying printed or electronic documentation, for example, shrink wrapped software, preloaded with a computer system, for example, on a system ROM or fixed disk, or distributed from a server or electronic bulletin board over a network, for example, the Internet or World Wide Web.

The present embodiments relate to the operation of a graphics processor, e.g. in a graphics processing system as illustrated in FIG. 1, when performing rendering of a scene to be displayed using a ray tracing based rendering process.

Ray tracing is a rendering process which involves tracing the paths of rays of light from a viewpoint (sometimes referred to as a "camera") back through sampling positions in an image plane (which is the frame being rendered) into a scene, and simulating the effect of the interaction between the rays and objects in the scene. The output data value e.g. colour of a sampling position in the image is determined based on the object(s) in the scene intersected by the ray passing through the sampling position, and the properties of the surfaces of those objects. The ray tracing process thus involves determining, for each sampling position, a set of objects within the scene which a ray passing through the sampling position intersects.

Figure 2:
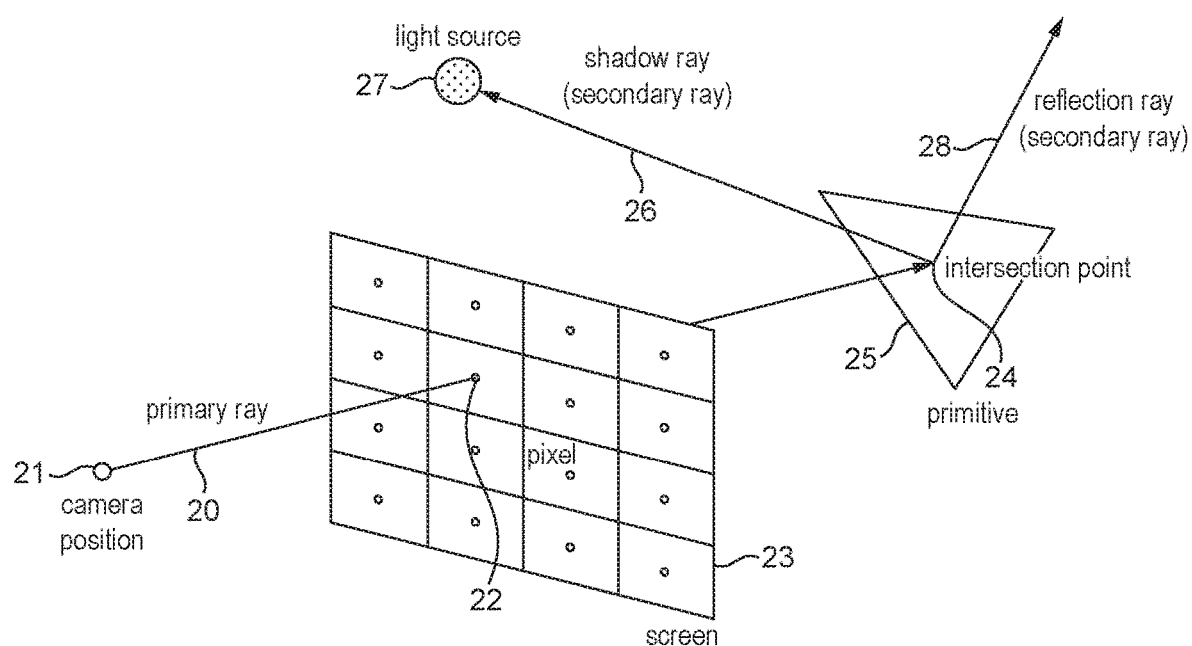
FIG. 2 is a schematic diagram illustrating a "full" ray tracing process.

FIG. 2 illustrates an exemplary "full" ray tracing process. A ray 20 (the "primary ray") is cast backward from a viewpoint 21 (e.g. camera position) through a sampling position 22 in an image plane (frame) 23 into the scene that is being rendered. The point 24 at which the ray 20 first intersects an object 25, e.g. a primitive, in the scene is identified. This first intersection will be with the object in the scene closest to the sampling position.

A secondary ray in the form of shadow ray 26 may be cast from the first intersection point 24 to a light source 27. Depending upon the material of the surface of the object 25, another secondary ray in the form of reflected ray 28 may be traced from the intersection point 24. If the object is, at least to some degree, transparent, then a refracted secondary ray may be considered.

Such casting of secondary rays may be used where it is desired to add shadows and reflections into the image. A secondary ray may be cast in the direction of each light source (and, depending upon whether or not the light source is a point source, more than one secondary ray may be cast back to a point on the light source).

In the example shown in FIG. 2, only a single bounce of the primary ray 20 is considered, before tracing the reflected ray back to the light source. However, a higher number of bounces may be considered if desired.

The output data for the sampling position 22 i.e. a colour value (e.g. RGB value) thereof, is then determined taking into account the interactions of the primary, and any secondary, ray(s) cast, with objects in the scene. The same process is conducted in respect of each sampling position to be considered in the image plane (frame) 23.

In order to facilitate such ray tracing processing, in the present embodiments acceleration data structures indicative of the geometry (e.g. objects) in scenes to be rendered are used when determining the intersection data for the ray(s) associated with a sampling position in the image plane to identify a subset of the geometry which a ray may intersect.

The ray tracing acceleration data structure represents and indicates the distribution of geometry (e.g. objects) in the scene being rendered, and in particular the geometry that falls within respective (sub-)volumes in the overall volume of the scene (that is being considered). In the present embodiments, ray tracing acceleration data structures in the form of Bounding Volume Hierarchy (BVH) trees are used (although other forms of acceleration data structure could also or instead be used, if desired).

Figure 3:
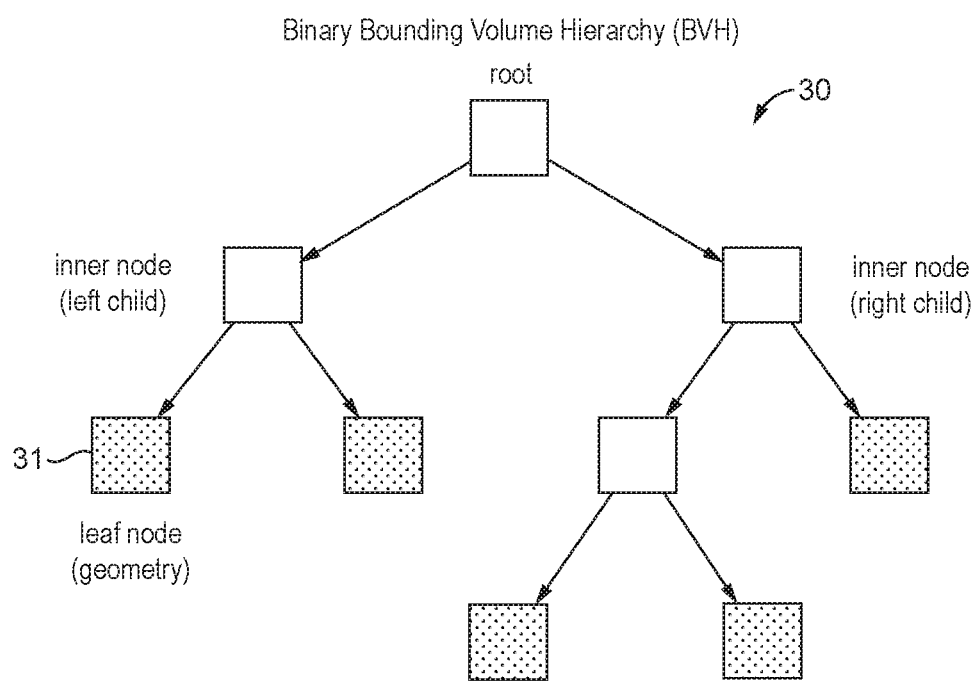
FIG. 3 shows an exemplary ray tracing acceleration data structure.

FIG. 3 shows an exemplary binary BVH tree 30, constructed by enclosing the complete scene in an axis-aligned bounding volume (AABV), e.g. a cube, and then recursively subdividing the bounding volume into successive pairs of two sub-AABVs according to any suitable and desired, and, e.g. various, subdivision schemes (e.g. same number of objects per child, based on traversal cost, etc.), until a desired smallest subdivision (volume) is reached.

Thus, each node in the BVH tree 30 will have a respective volume of the scene being rendered associated with it, with the end, leaf nodes 31 each representing a particular, non-overlapping, smallest subdivided volume of the scene, and any parent node representing, and being associated with, the volume of its child nodes. Each leaf node will also correspondingly be associated with the geometry defined for the scene that falls, at least in part, within the volume that the leaf node corresponds to (e.g. whose centroid falls within the volume in question). The BVH tree acceleration data structure also stores (either for the nodes themselves or otherwise, e.g. as sideband information), appropriate information to allow the tree to be traversed volume-by-volume on the basis of the origin and direction of a ray so as to be able to identify a leaf node representing a volume that the ray passes through.

This then allows and facilitates testing a ray against the hierarchy of bounding volumes in the BVH tree until a leaf node is found. It is then only necessary to test the geometry associated with the particular leaf node for intersection with the ray.

Figure 4:
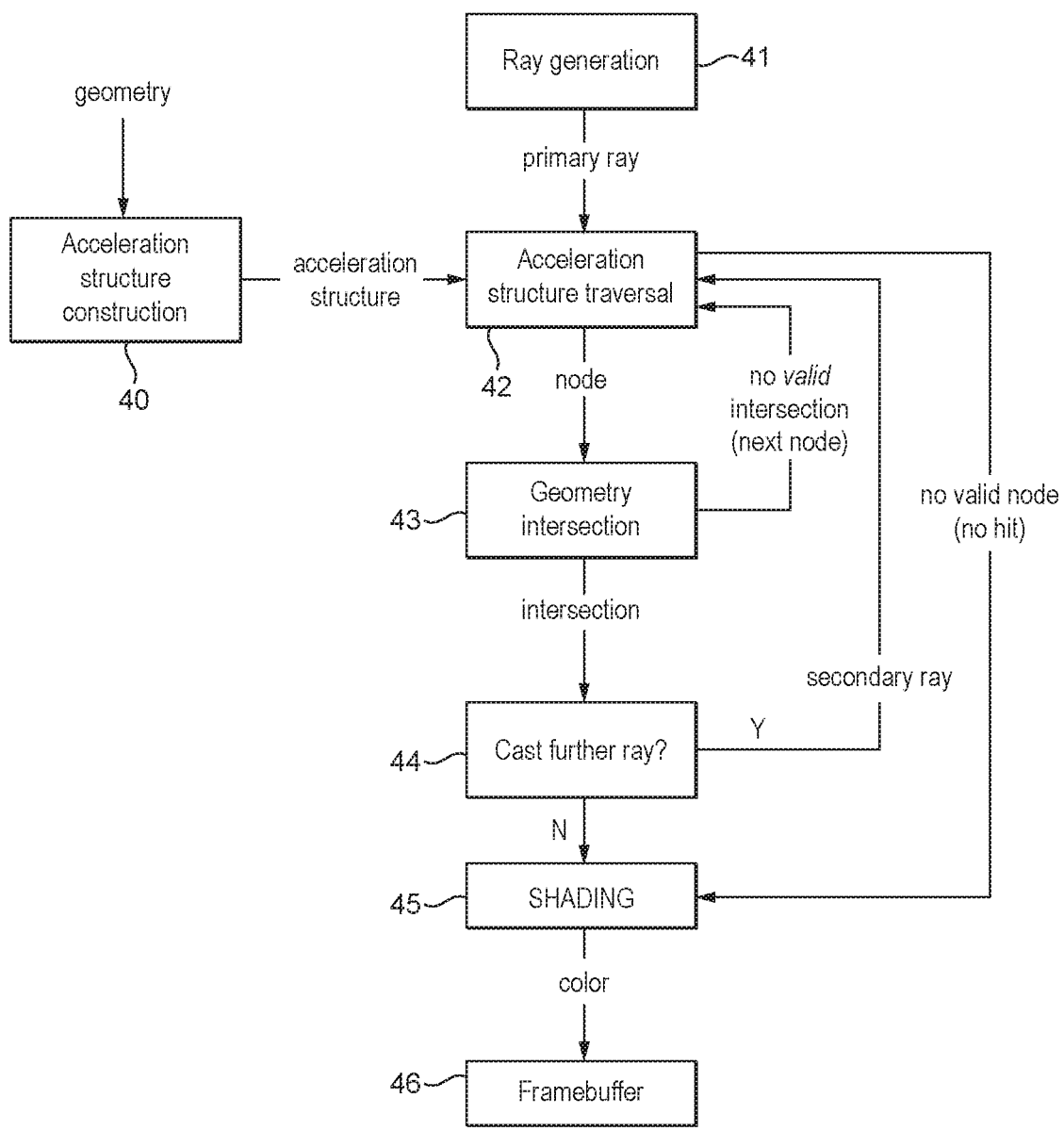
FIG. 4 is a flow chart illustrating an embodiment of a full ray tracing process.

FIG. 4 is a flow chart showing the ray tracing process in embodiments of the technology described herein, and that will be performed on and by the graphics processor 2.

First, the geometry of the scene is analysed and used to obtain an acceleration data structure (step 40), for example in the form of a BVH tree structure, as discussed above. This can be done in any suitable and desired manner, for example by means of an initial processing pass on the graphics processor 2.

A primary ray is then generated, passing from a camera through a particular sampling position in an image plane (frame) (step 41). The acceleration data structure is then traversed for the primary ray (step 42), and the leaf node corresponding to the first volume that the ray passes through which contains geometry which the ray potentially intersects is identified. It is then determined whether the ray intersects any of the geometry, e.g. primitives, (if any) in that leaf node (step 43).

If no (valid) geometry which the ray intersects can be identified in the node, the process returns to step 42, and the ray continues to traverse the acceleration data structure and the leaf node for the next volume that the ray passes through which may contain geometry with which the ray intersects is identified, and a test for intersection performed at step 43.

This is repeated for each leaf node that the ray (potentially) intersects, until geometry that the ray intersects is identified When geometry that the ray intersects is identified, it is then determined whether to cast any further (secondary) rays for the primary ray (and thus sampling position) in question (step 44). This may be based, e.g., and in an embodiment, on the nature of the geometry (e.g. its surface properties) that the ray has been found to intersect, and the complexity of the ray tracing process being used. Thus, as shown in FIG. 4, one or more secondary rays may be generated emanating from the intersection point (e.g. a shadow ray(s), a refraction ray(s) and/or a reflection ray(s), etc.). Steps 42, 43 and 44 are then performed in relation to each secondary ray.

Once there are no further rays to be cast, a shaded colour for the sampling position that the ray(s) correspond to is then determined based on the result(s) of the casting of the primary ray, and any secondary rays considered (step 45), taking into account the properties of the surface of the object at the primary intersection point, any geometry intersected by secondary rays, etc. The shaded colour for the sampling position is then stored in the frame buffer (step 46).

If no (valid) node which may include geometry intersected by a given ray (whether primary or secondary) can be identified in step 42 (and there are no further rays to be cast for the sampling position), the process moves to step 45, and shading is performed. In this case, the shading is in an embodiment based on some form of "default" shading operation that is to be performed in the case that no intersected geometry is found for a ray. This could comprise, e.g., simply allocating a default colour to the sampling position, and/or having a defined, default geometry to be used in the case where no actual geometry intersection in the scene is found, with the sampling position then being shaded in accordance with that default geometry. Other arrangements would, of course, be possible.

This process is performed for each sampling position to be considered in the image plane (frame).

Figure 5:
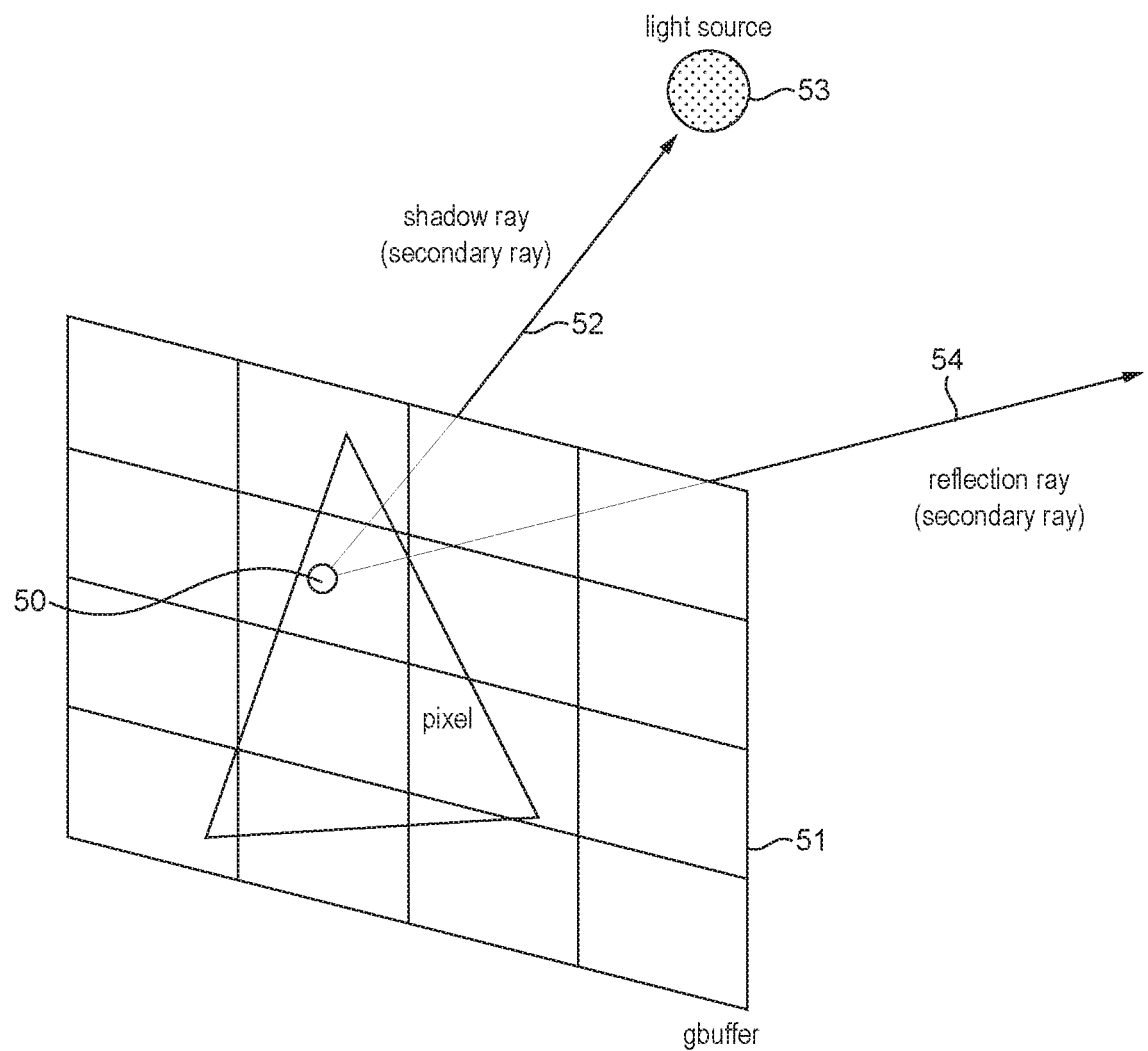
FIG. 5 is a schematic diagram illustrating a "hybrid" ray tracing process.

FIG. 5 shows an alternative ray tracing process which may be used in embodiments of the technology described herein, in which only some of the steps of the full ray tracing process described in relation to FIGS. 3 and 4 are performed. Such an alternative ray tracing process may be referred to as a "hybrid" ray tracing process.

In this process, as shown in FIG. 5, the first intersection point 50 for each sampling position in the image plane (frame) is instead determined first using a rasterisation process and stored in an intermediate data structure known as a "G-buffer" 51. Thus, the process of generating a primary ray for each sampling position, and identifying the first intersection point of the primary ray with geometry in the scene, is replaced with an initial rasterisation process to generate the "G-buffer". The G-buffer includes information indicative of the depth, colour, normal and surface properties (and any other appropriate and desired data, e.g. albedo, etc.) for each first (closest) intersection point for each sampling position in the image plane (frame).

Secondary rays, e.g. shadow ray 52 to light source 53, and reflection ray 54, may then be cast starting from the first intersection point 50, and the shading of the sampling positions determined based on the properties of the geometry first intersected, and the interactions of the secondary rays with geometry in the scene.

Referring to the flowchart of FIG. 4, in such a hybrid process, the initial pass of steps 41, 42 and 43 of the full ray tracing process for a primary ray will be omitted, as there is no need to cast primary rays and determine their first intersection with geometry in the scene. The first intersection point data for each sampling position is instead obtained from the G-buffer.

The process may then proceed to the shading stage 45 based on the first intersection point for each pixel obtained from the G-buffer, or where secondary rays emanating from the first intersection point are to be considered, these will need to be cast in the manner described by reference to FIG. 4. Thus, steps 42, 43 and 44 will be performed in the same manner as previously described in relation to the full ray tracing process for any secondary rays.

The colour determined for a sampling position will be written to the frame buffer in the same manner as step 46 of FIG. 4, based on the shading colour determined for the sampling position based on the first intersection point (as obtained from the G-buffer), and, where applicable, the intersections of any secondary rays with objects in the scene, determined using ray tracing.

The present embodiments relate in particular to the operation of a graphics processor when performing ray tracing-based rendering, e.g. as described above with reference to FIGS. 2-4, and in particular to the ray tracing acceleration data structure traversal, geometry intersection, and further processing (steps 42-45 in FIG. 4) performed as part of the ray tracing operation.

Figure 6:
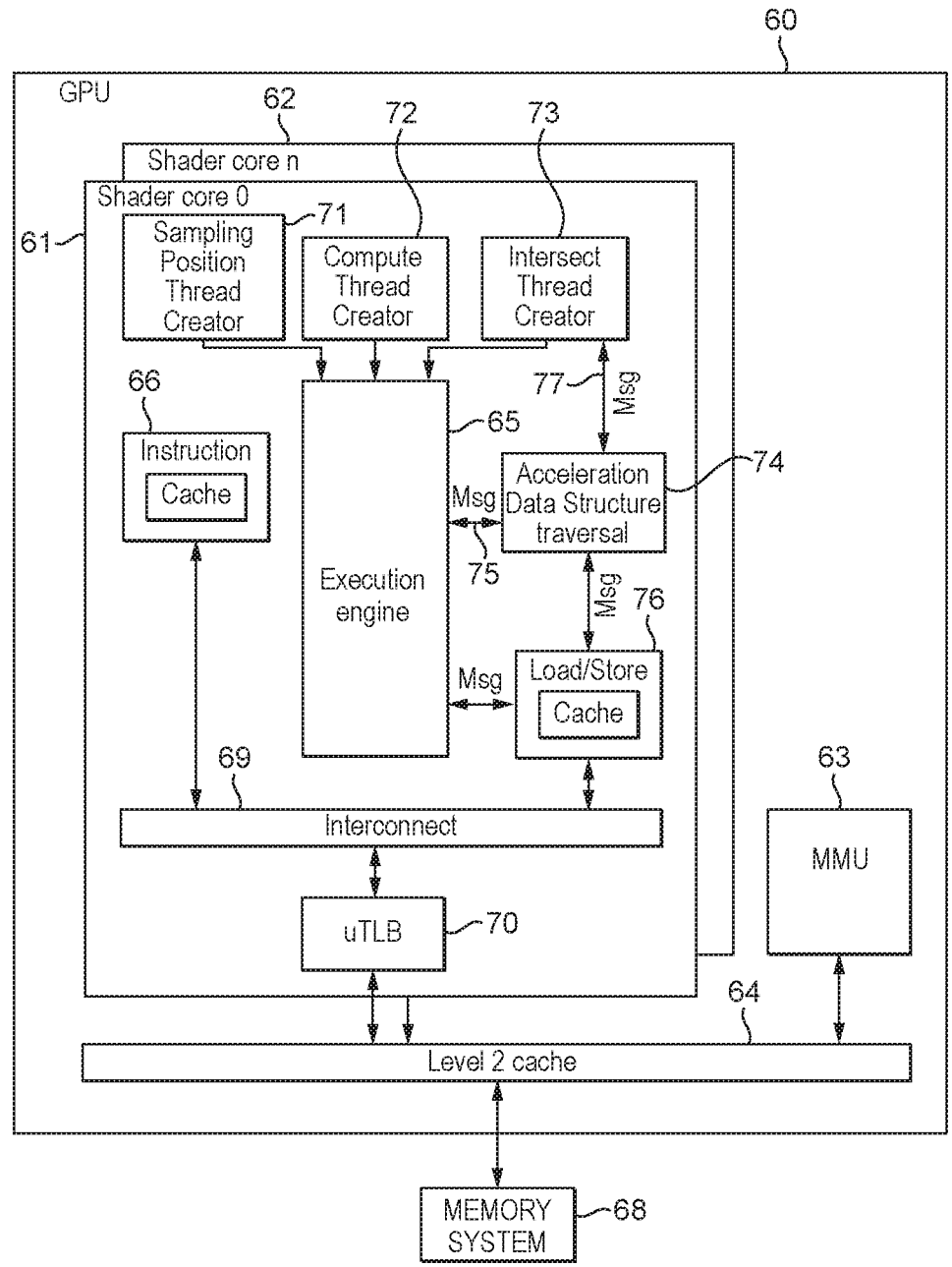
FIG. 6 shows schematically an embodiment of a graphics processor that can be operated in the manner of the technology described herein.

FIG. 6 shows schematically the relevant elements and components of a graphics processor (GPU) 60 of the present embodiments.

As shown in FIG. 6, the GPU 60 includes one or more shader (processing) cores 61, 62 together with a memory management unit 63 and a level 2 cache 64 which is operable to communicate with an off-chip memory system 68 (e.g. via an appropriate interconnect and (dynamic) memory controller).

FIG. 6 shows schematically the relevant configuration of one shader core 61, but as will be appreciated by those skilled in the art, any further shader cores of the graphics processor 60 will be configured in a corresponding manner.

(The graphics processor (GPU) shader cores 61, 62 are programmable processing units (circuits) that perform processing operations by running small programs for each "item" in an output to be generated such as a render target, e.g. frame. An "item" in this regard may be, e.g. a vertex, one or more sampling positions, etc. The shader cores will process each "item" by means of one or more execution threads which will execute the instructions of the shader program(s) in question for the "item" in question. Typically, there will be multiple execution threads each executing at the same time (in parallel).)

FIG. 6 shows the main elements of the graphics processor 60 that are relevant to the operation of the present embodiments. As will be appreciated by those skilled in the art there may be other elements of the graphics processor 60 that are not illustrated in FIG. 6. It should also be noted here that FIG. 6 is only schematic, and that, for example, in practice the shown functional units may share significant hardware circuits, even though they are shown schematically as separate units in FIG. 6. It will also be appreciated that each of the elements and units, etc., of the graphics processor as shown in FIG. 6 may, unless otherwise indicated, be implemented as desired and will accordingly comprise, e.g., appropriate circuits (processing logic), etc., for performing the necessary operation and functions.

As shown in FIG. 6, each shader core of the graphics processor 60 includes an appropriate programmable execution unit (execution engine) 65 that is operable to execute graphics shader programs for execution threads to perform graphics processing operations.

The shader core 61 also includes an instruction cache 66 that stores instructions to be executed by the programmable execution unit 65 to perform graphics processing operations. The instructions to be executed will, as shown in FIG. 6, be fetched from the memory system 68 via an interconnect 69 and a micro-TLB (translation lookaside buffer) 70.

The shader core 61 also includes an appropriate load/store unit 76 in communication with the programmable execution unit 65, that is operable, e.g., to load into an appropriate cache, data, etc., to be processed by the programmable execution unit 65, and to write data back to the memory system 68 (for data loads and stores for programs executed in the programmable execution unit). Again, such data will be fetched/stored by the load/store unit 76 via the interconnect 69 and the micro-TLB 70.

In order to perform graphics processing operations, the programmable execution unit 65 will execute graphics shader programs (sequences of instructions) for respective execution threads (e.g. corresponding to respective sampling positions of a frame to be rendered).

Accordingly, as shown in FIG. 6, the shader core 61 further comprises a number of thread creators (generators) operable to generate execution threads for execution by the programmable execution unit 65, including a sampling position thread creator 71 (which will generate execution threads corresponding to sampling positions to be processed), a compute thread creator 72 (which will generate execution threads corresponding to compute items when the graphics processor is performing compute shading operations), and an "intersect" thread creator 73 (which is operable to generate execution threads to perform processing operations when the results of ray tracing acceleration data structure traversals are available from a ray tracing acceleration data structure traversal circuit 74 (this operation will be discussed in more detail below).

As shown in FIG. 6, the shader core 61 also includes a ray tracing acceleration data structure traversal circuit 74, which is in communication with the programmable execution unit 65, and which is operable to perform ray tracing acceleration data structure traversals (i.e. the operation of step 42 of FIG. 4) for rays being processed as part of a ray tracing-based rendering process, in response to messages 75 received from the programmable execution unit 65. The ray tracing acceleration data structure traversal circuit 74 is also able to communicate with the intersect thread creator 73 to trigger the generation and execution of "intersect" threads, and with the load/store unit 76.

In the present embodiments, the ray tracing acceleration data structure traversal circuit 74 of the graphics processor is a (substantially) fixed-function hardware unit (circuit) that is configured to perform a traversal of a ray tracing acceleration data structure to determine geometry for a scene to be rendered that may be intersected by a ray being used for a ray tracing operation, and is configured to traverse a ray tracing acceleration data structure for a ray in a similar manner to a page table walk in a memory management unit (MMU).

The ray tracing acceleration data structure traversal circuit is operable to perform a plurality of acceleration data structure traversals (for a plurality of different rays) in parallel.

Other arrangements would, of course, be possible.

Figure 7:
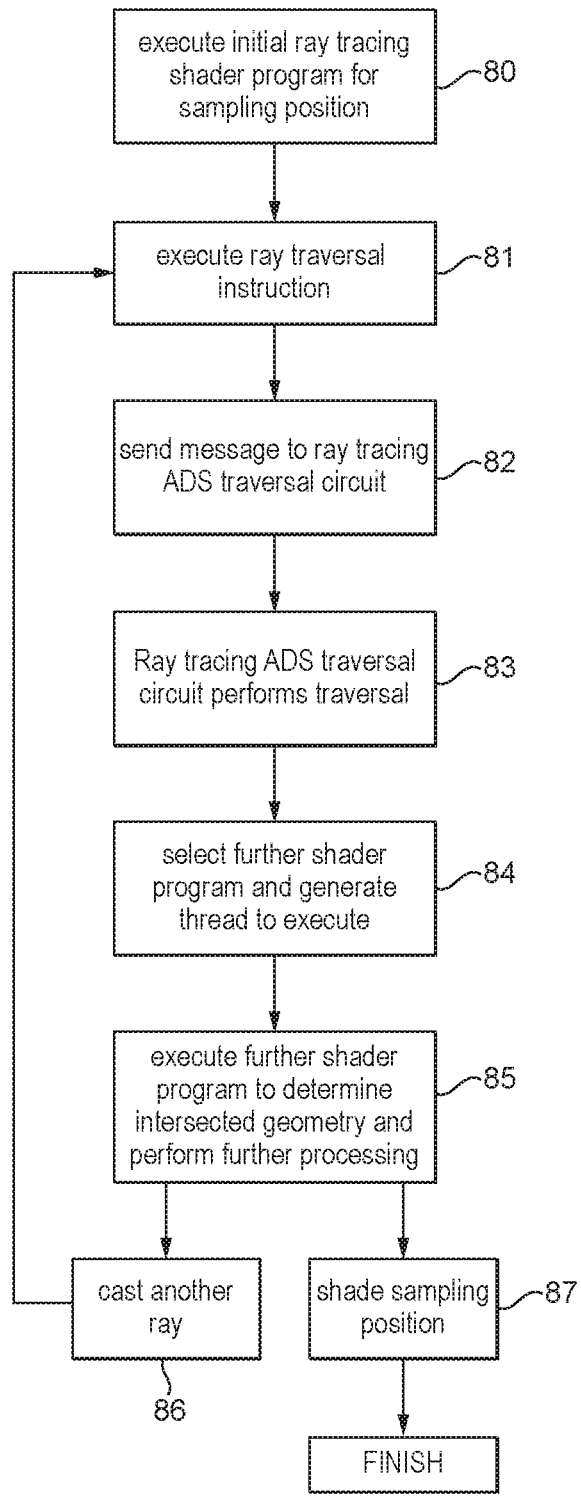
FIG. 7 is a flowchart showing the operation of the graphics processor in FIG. 6 in an embodiment of the technology described herein.

FIG. 7 is a flowchart showing the operation of a shader core 61 of the graphics processor 60 when performing a ray tracing-based rendering process to render a view of the scene in an embodiment of the technology described herein.

FIG. 7 shows the operation in respect of a given sampling position of the frame being rendered. This operation will be repeated for each sampling position of the frame being rendered, and by each respective shader core that is active and being used to render the frame.

As discussed above, in the present embodiments, sampling positions are rendered by generating respective execution threads for the sampling positions and then executing appropriate shader programs for those threads. Thus, the process will start with the sampling position thread creator 71 generating an appropriate execution thread corresponding to the sampling position that is being rendered. The execution thread will then execute an initial ray tracing shader program to perform the ray tracing-based rendering process for the sampling position (step 80).

In the present embodiments, the initial ray tracing shader program that is executed for a sampling position will, inter alia, include one or more "ray traversal" instructions that when executed trigger the programmable execution unit 65 to send a message 75 to the ray tracing acceleration data structure traversal circuit 74 to perform the required ray tracing acceleration data structure traversal circuit for the ray in question.

Thus, as shown in FIG. 7, when, during execution of the initial ray tracing shader program for a sampling position, the programmable execution unit 65 encounters and executes such a "ray traversal" instruction (step 81), the programmable execution unit 65 then sends a message 75 to the ray tracing acceleration data structure traversal circuit 74 to trigger the ray tracing acceleration data structure traversal circuit 74 to perform the necessary ray tracing acceleration data structure traversal for the ray in question (step 82).

The message 75 that is sent from the programmable execution unit 65 to the ray tracing acceleration data structure traversal circuit 74 indicates the ray tracing acceleration data structure that is to be traversed; the origin (originating position (x, y coordinates)) for the ray for which the traversal of the ray tracing acceleration data structure is to be determined; a direction vector for the ray that is to traverse the ray tracing acceleration data structure; and the (minimum and/or maximum) distance the ray is to traverse into the scene.

As shown in FIG. 7, in response to the message from the programmable execution unit 65, the ray tracing acceleration data structure traversal circuit 74 performs the necessary ray tracing acceleration data structure traversal (step 83).

The traversal operation uses the information provided about the ray to traverse the ray tracing acceleration data structure to determine geometry for the scene to be rendered that may be intersected by the ray in question. In the present embodiments, the traversal process operates to traverse the ray tracing acceleration data structure based on the position and direction of the ray, to determine for each volume of the scene that the ray passes through in turn, whether there is any geometry in the volume (indicated by the ray tracing acceleration data structure), until a first (potential) intersection with geometry defined for the scene is found for the ray.

Other arrangements would, of course, be possible.

The ray tracing acceleration data structure traversal for a ray can comprise traversing a single ray tracing acceleration data structure for the ray, or traversing plural ray tracing acceleration data structures for the ray (e.g. in the case where the overall volume of, and/or geometry for, the scene is represented by plural different ray tracing acceleration data structures, and/or where an initial ray tracing acceleration data structure that indicates further ray tracing acceleration data structures to be traversed is first traversed).

Once the ray tracing acceleration data structure traversal circuit 74 has performed the necessary traversal or traversals for a ray, and determined geometry that is (potentially) intersected by the ray, that information is returned to the programmable execution unit 65, for the programmable execution unit to perform further processing for the sampling position in question as a result of, and based on, the result of the determined traversal for the ray.

The result of the determined traversal for the ray that is returned by the ray tracing acceleration data structure traversal circuit is, in the case that the ray was found to intersect a volume of the scene that contains geometry defined for the scene, an indication of the defined geometry in the volume or volumes determined to be intersected by the ray. The indication will indicate the geometry for the scene to be rendered that may be intersected by the ray, together with the appropriate properties, such as the surface type, of the geometry in question (e.g. by means of indexes/pointers to data structure(s) where data relating to the properties of the geometry is stored).

In the case that the ray tracing acceleration data structure traversal circuit finds that the ray does not traverse any volume it contains defined geometry for the scene, then the ray tracing acceleration data structure traversal circuit returns an indication of a predefined, "bounding" surface that is to be used for rays that pass through the scene without intersecting any otherwise defined geometry for the scene.

In the present embodiments, the programmable execution unit 65 executes a further "surface processing" shader program that will perform further processing for the sampling position in question based on the result of the ray tracing acceleration data structure traversal for the ray.

In the present embodiments, there are plural different sets of further "surface processing" shader programs that can be executed, in dependence upon the type of geometry that has been determined by the ray tracing acceleration data structure traversal circuit as (potentially) being intersected by a ray (and in particular in dependence upon the particular surface type (surface property or properties) of the geometry determined by the ray tracing acceleration data structure traversal circuit).

Thus the process operates to select the further "processing" shader program to be executed to perform further processing for the sampling position corresponding to a ray in accordance with the type of geometry (and in particular the surface type), that has been determined by the ray tracing acceleration data structure traversal circuit as (potentially) being intersected by the ray.

In order to perform and control this operation, in the present embodiments, the ray tracing acceleration data structure traversal circuit triggers the generation of an execution thread that is to execute (and that executes) the selected further "surface processing" shader program for the geometry type in question.

To do this, as shown in FIGS. 6 and 7, the ray tracing acceleration data structure traversal circuit 74 sends a message 77 to the intersect thread creator 73, for the intersect thread creator 73 to generate a new execution thread that will execute the appropriate further shader program to perform further processing for the sampling position in question (step 84).

The message 77 that is sent by the ray tracing acceleration data structure traversal circuit to the intersect thread creator 73 indicates at least the geometry surface type, and the position and direction vectors for the ray. The intersect thread creator 73 then uses that information to generate an appropriate execution thread and to select the appropriate further shader program to perform further processing for the sampling position in question.

The programmable execution unit 65 then executes the selected further shader program for the generated thread (step 85). The execution of the selected further shader program will, inter alia, as shown in FIG. 7, use the result of the ray tracing acceleration data structure traversal performed by the ray tracing acceleration data structure traversal circuit 74 to determine any geometry that is intersected by the ray in question, and perform further processing for the sampling position in question based on any determined geometry intersection.

The intersection determination uses the indication of geometry that may be intersected by the ray, together with the relevant ray properties, to test whether any of the geometry is actually intersected by the ray.

As shown in FIG. 7, the further processing for a sampling position that the further shader program performs can include the casting of another ray (a secondary ray) for the sampling position in question (step 86) (in which case the process of using the ray tracing acceleration data traversal circuit 74 to perform the ray tracing acceleration data structure traversal for a ray, etc. (steps 81-85) will, as shown in FIG. 7, be repeated for that another (secondary) ray), and, additionally or alternatively, e.g. once all the necessary rays for the sampling position have been cast, shading the sampling position in question (i.e. generate an output colour value for the sampling position in question) (step 87).

Once the final output value for the sampling position in question has been generated, the processing in respect of that sampling position is completed. A next sampling position may then be processed in a similar manner, and so on, until all the sampling positions for the frame have been appropriately shaded. The frame may then be output, e.g. for display, and the next frame to be rendered processed in a similar manner, and so on.

Figure 8:
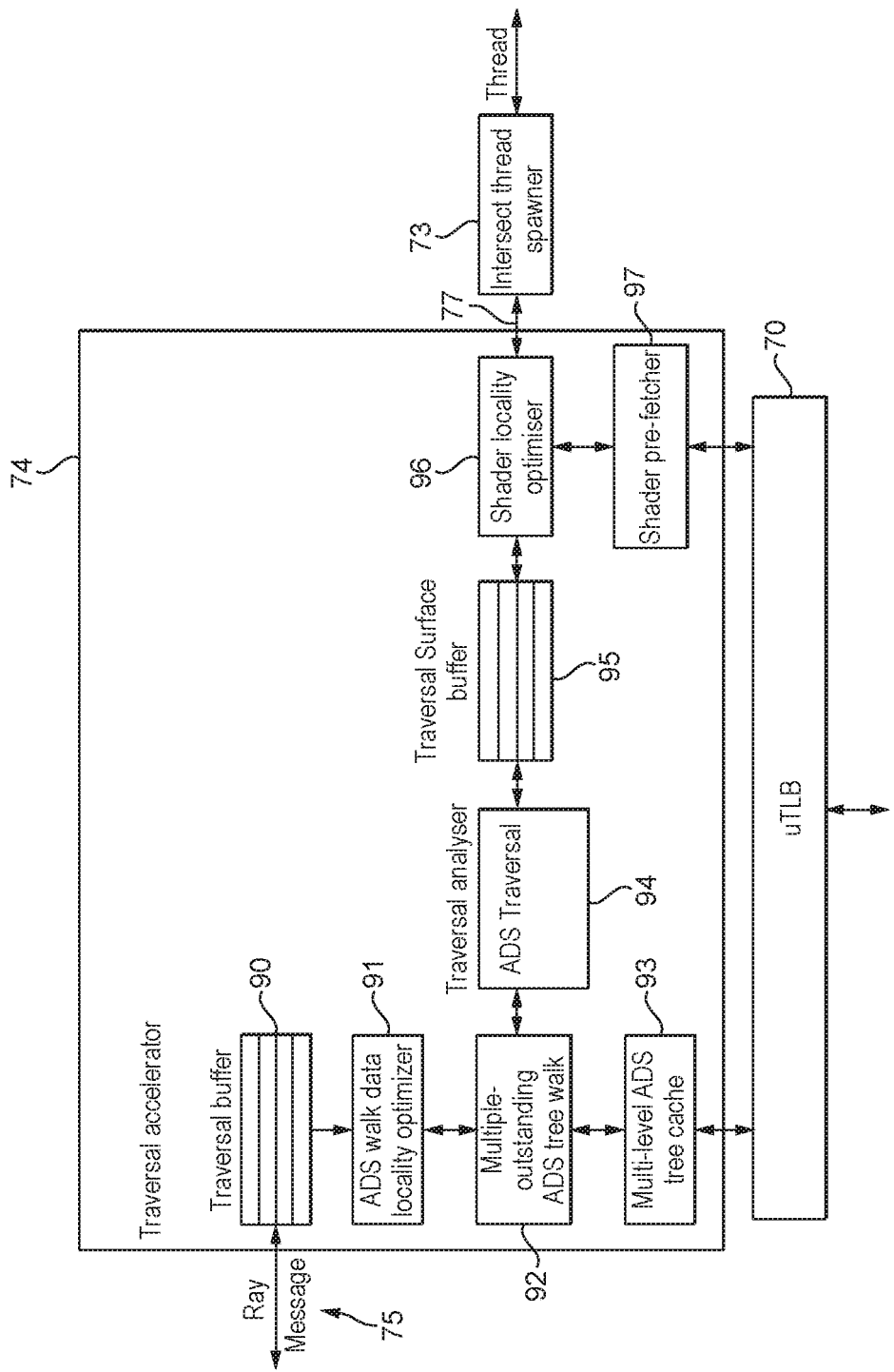
FIG. 8 shows an embodiment of the ray tracing acceleration data structure traversal circuit of the graphics processor of FIG. 6.

FIG. 8 shows schematically the operation and elements of the ray tracing acceleration data structure traversal circuit 74 that are relevant to the performing of the ray tracing acceleration data structure ray traversals by the ray tracing acceleration data traversal circuit 74 (steps 82-84 in FIG. 7).

As shown in FIG. 8, the ray tracing acceleration data structure traversal circuit 74 includes a message buffer 90 in which messages 75 requesting ray traversals from the programmable execution unit 65 can be buffered, before they are processed by the ray tracing acceleration data structure traversal circuit 74.

The ray tracing acceleration data structure traversal circuit 74 then includes a controller 91 (in the form of an ADS walk data locality optimiser) that is operable to select ray traversal messages from the buffer 90 for processing.

The controller 91 operates in particular to select a group of plural ray traversal operations that are to traverse the same ray tracing acceleration data structure from the message buffer 90, so as to perform those ray traversals together. The rays are grouped for traversing the same ray tracing acceleration data structure together based on the similarities of their starting positions (origins), their directions (direction vectors), and the range (distance) that the rays are to be cast for, so that the ray tracing acceleration data structure traversals for similar rays will be performed together (thereby increasing memory access locality, etc.). (The ages of ray traversal messages in the message buffer 90 are tracked, so that any ray traversals that could be in the message buffer 90 for too long can be prioritised for processing.)

Once the controller 91 has selected a group of ray traversals to perform together, the traversal accelerator performs the necessary acceleration data structure walks 92 for the rays in question. As shown in FIG. 8, the ray tracing acceleration data structure tree walks traverse 94 the appropriate ray tracing acceleration data structure, to determine the volumes and geometry potentially intersected by the rays.

To facilitate this, as shown in FIG. 8, the ray tracing acceleration data structure traversal circuit 74 includes a multi-level ADS tree cache 93, in which data from ray tracing acceleration data structures can be stored locally to the ray tracing acceleration data structure traversal circuit 74.

The results of the ray traversals are then stored in a traversal surface buffer 95, in which ray traversal results can be buffered, before they are returned for further processing to the programmable execution unit.

As discussed above, in the present embodiments, the results of the ray tracing acceleration data structure traversals are returned to, and processed by, the programmable execution unit of the graphics processor, by generating further execution threads, that then execute an appropriate "surface processing" shader program to perform the geometry intersection determination and any required further processing for the sampling position corresponding to the ray.

Thus, as shown in FIG. 8, the waiting ray traversal results in the traversal surface buffer 95 are selected from the buffer 95 by an appropriate controller (a shader locality optimiser)

96 that is operable to select ray traversal results from the buffer 95 for processing, which controller 96 then sends a corresponding message to the intersect thread spawner 73 to generate an execution thread in response to and for processing the ray traversal result.

In the present embodiments, the controller 96 operates to select groups of ray traversal results for which execution threads should be generated from the ray traversal result buffer 95, so as to execute the further surface processing shading program for those ray traversal results together. The ray traversal results are grouped together based on the surface type for the geometry to be processed for the ray traversal results, such that ray traversal results that require the same "surface processing" shader program to be executed for their further processing are grouped together and executed together.

(The ages of ray traversal results in the buffer 95 are tracked, so that any ray traversal results that could be in the buffer 95 for too long can be prioritised for processing.)

Once the controller 96 has selected a group of ray traversal results to be further processed together, the controller 91 issues a corresponding set of messages 77 to the intersect thread spawner 73 so as to trigger the generation of a corresponding group of execution threads for executing the "surface processing" shader program for the selected group of threads.

The intersect thread spawner 73 will then correspondingly generate an appropriate group of execution threads, and issue those threads to the programmable execution unit 65 so as to execute the selected "surface processing" shader program for those threads.

As shown in FIG. 8, the controller 96 is also operable to communicate with a shader program pre-fetcher 97, to trigger the pre-fetching of surface processing shader programs to be executed from the memory system 68, based on its knowledge of which ray traversal results it is going to issue messages to the intersect thread spawner 73 for in the future. The controller 96 could also be operable to trigger the pre-fetching of other data structures needed for the execution of the surface processing shader programs, such as graphics textures, if desired.

As will be appreciated from the above, the ray tracing based rendering process of the present embodiments involves, inter alia, the programmable execution unit 65 of the graphics processor 60 executing appropriate shader programs to perform the ray tracing-based rendering. In the present embodiments, these shader programs are generated by a compiler (the shader compiler) 12 for the graphics processor 60, e.g. that is executing on a central processing unit (CPU), such as a host processor, of the graphics processing system (and in an embodiment as part of the driver 11 operation for the graphics processor).

The compiler (driver) will receive the high level ray tracing-based rendering shader program or programs to be executed from the application 13 that requires the ray tracing-based rendering, and then compile that program or programs into appropriate shader programs for execution by the graphics processor, and, as part of this processing, will, as discussed above, include in one or more of the compiled shader programs to be executed by the graphics processor, an appropriate "ray traversal" instruction or instructions to cause the programmable execution unit to send a message to the ray tracing acceleration data structure traversal circuit to perform a ray traversal for the ray. Correspondingly, the compiler will also generate an appropriate set of further "surface processing" shader programs to be executed in response to, and in dependence upon the results of, a ray traversal determined by the ray tracing acceleration data structure traversal circuit.

The compilation process (the compiler) can use any suitable and desired compiler techniques for this.

Figure 9:
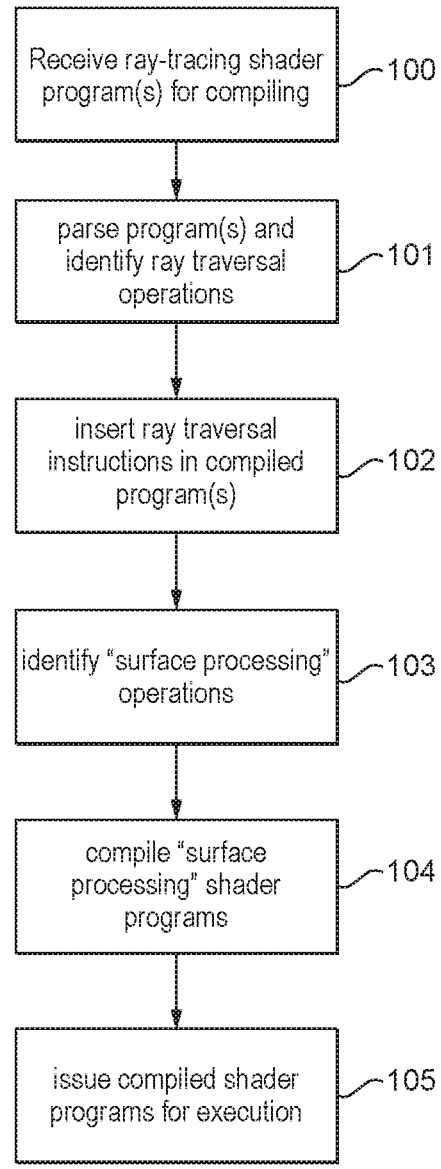
FIG. 9 shows an embodiment of a shader program compilation process.

FIG. 9 shows an embodiment of the compilation process.

As shown in FIG. 9, the compiler for the graphics processor will receive a ray tracing-based rendering program or programs for compiling (step 100).

The compiler will then analyse the shader program code that is provided, to identify ray traversal operations in that shader program code (step 101), and to correspondingly insert ray traversal instruction(s) at the appropriate point(s) in the compiled shader program(s) (step 102).

The compiler will also identify the different "surface processing" operations to be performed in response to the results of ray traversal determinations in the received shader program(s) for compiling (step 103), and correspondingly compile a set of plural different "surface processing" shader programs for execution by the graphics processor accordingly (step 104).

The compiled shader programs, including the plurality of different "surface processing" shader programs, will then be issued to the graphics processor for execution (e.g. stored in appropriate memory of and/or accessible to the graphics processor, so that the graphics processor can fetch the required shader programs for execution as required) (step 105).

It can be seen from the above that the technology described herein, in its embodiments at least, can provide a more efficient process for performing ray tracing-based rendering. This is achieved, in the embodiments of the technology described herein at least, by using a ray tracing acceleration data structure traversal circuit to perform ray tracing acceleration data structure traversals for rays being processed, but with other processing for the ray tracing-based rendering being performed by executing an appropriate shader program or programs using a programmable execution unit of the graphics processor.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processor when rendering a frame that represents a view of a scene comprising one or more objects using a ray tracing process, the graphics processor comprising:
   a programmable execution unit operable to execute graphics processing programs to perform graphics processing operations; and
   a ray tracing acceleration data structure traversal circuit operable to perform a traversal of a ray tracing acceleration data structure indicative of the distribution of geometry for a scene to be rendered to determine geometry for a scene to be rendered that may be intersected by a ray being used for a ray tracing operation;

wherein:
the programmable execution unit is operable to communicate with the ray tracing acceleration data structure traversal circuit to cause the ray tracing acceleration data structure to perform a traversal of a ray tracing acceleration data structure for a ray, and to receive responses from the ray tracing data structure traversal circuit indicative of geometry that may be intersected by the ray that has been determined by the ray tracing acceleration data structure traversal circuit;
the method comprising:
the programmable execution unit:
executing a graphics processing program to render a frame that represents a view of a scene comprising one or more objects using a ray tracing process; and
when executing the program and the ray tracing process requires the determination of geometry that will be intersected by a ray, sending a message to the ray tracing acceleration data structure traversal circuit to perform a traversal of a ray tracing acceleration data structure for the scene to determine geometry for the scene that may be intersected by the ray;
the ray tracing acceleration data structure traversal circuit in response to the message from the programmable execution unit:
performing a traversal of a ray tracing acceleration data structure for the scene for the ray to determine geometry for the scene to be rendered that may be intersected by the ray and returning to the programmable execution unit an indication of geometry that may be intersected by the ray; and
the programmable execution unit:
using the indicated geometry determined by the ray tracing acceleration data structure traversal circuit to perform intersection testing to thereby determine any geometry that is intersected by the ray; and
performing further processing for a sampling position in the frame that the ray corresponds to in accordance with any geometry for the scene determined to be intersected by the ray.

2. The method of claim 1, wherein the message that is sent from the programmable execution unit to the ray tracing acceleration data structure traversal circuit indicates one or more of:
the ray tracing acceleration data structure that is to be traversed;
the originating position for the ray for which the traversal of the ray tracing acceleration data structure is to be determined;
a direction vector for the ray that is to traverse the ray tracing acceleration data structure; and
a minimum and/or maximum distance that the ray is to traverse into the scene.

3. The method of claim 1, wherein the programmable execution unit sends the message to the ray tracing acceleration data structure traversal circuit in response to executing an instruction that triggers the programmable execution unit to send the message to the ray tracing acceleration data structure traversal circuit.

4. The method of claim 1, wherein the ray tracing acceleration data structure traversal operation for a ray comprises traversing plural ray tracing acceleration data structures for the ray, to thereby determine geometry for the scene to be rendered that may be intersected by the ray.

5. The method of claim 1, comprising:
grouping rays for traversing a ray tracing acceleration data structure together, based on one or more of:
the originating positions for the rays; and
the direction vectors for the rays.

6. The method of claim 1, wherein the further processing for the sampling position in the frame that the ray corresponds to that is performed in accordance with any geometry for the scene determined to be intersected by the ray comprises one of:
casting a further ray for the sampling position in question; and
shading the sampling position so as to provide an output colour value for the sampling position for the frame.

7. The method of claim 1, wherein the further processing for the sampling position in the frame that the ray corresponds to that is performed in accordance with any geometry for the scene determined to be intersected by the ray is performed by the programmable execution unit executing further processing instructions that will cause the programmable execution unit to perform the required processing operations.

8. The method of claim 7, wherein there are plural different sets of further processing instructions to be executed in dependence upon the type of geometry that is determined and indicated by the ray tracing acceleration data structure traversal circuit.

9. The method of claim 7, comprising:
generating a new execution thread for executing the further processing instructions that will cause the programmable execution unit to perform the further processing for the sampling position in the frame that the ray corresponds in accordance with any geometry for the scene determined to be intersected by the ray; and
wherein:
execution threads that are to be executed to continue the processing of sampling positions when ray traversal results are available are grouped together for execution by the programmable execution unit based on a property or properties of the geometry indicated by the ray tracing acceleration data structure traversal circuit for the corresponding rays.

10. A graphics processor operable to render a frame that represents a view of a scene comprising one or more objects using a ray tracing process, the graphics processor comprising:
a programmable execution unit operable to execute graphics processing programs to perform graphics processing operations; and
a ray tracing acceleration data structure traversal circuit operable to perform a traversal of a ray tracing acceleration data structure indicative of the distribution of geometry for a scene to be rendered to determine geometry for a scene to be rendered that may be intersected by a ray being used for a ray tracing operation;
wherein:
the programmable execution unit is configured to communicate with the ray tracing acceleration data structure traversal circuit to cause the ray tracing acceleration data structure to perform a traversal of a ray tracing acceleration data structure for a ray, and to receive responses from the ray tracing data structure traversal circuit indicative of geometry that may be intersected by the ray that has been determined by the ray tracing acceleration data structure traversal circuit;

the programmable execution unit is further configured to:
    execute a graphics processing program to render a frame that represents a view of a scene comprising one or more objects using a ray tracing process; and
    when executing the program and the ray tracing process requires the determination of geometry that will be intersected by a ray, send a message to the ray tracing acceleration data structure traversal circuit to perform a traversal of a ray tracing acceleration data structure for the scene to determine geometry for the scene that may be intersected by the ray;
the ray tracing acceleration data structure traversal circuit is configured to:
    in response to a message from the programmable execution unit to perform a traversal of a ray tracing acceleration data structure for a scene to be rendered to determine geometry for the scene that may be intersected by a ray:
    perform a traversal of the ray tracing acceleration data structure for the scene for the ray to determine geometry for the scene to be rendered that may be intersected by the ray and return to the programmable execution unit an indication of geometry that may be intersected by the ray; and
the programmable execution unit is further configured to:
    use indicated geometry determined by the ray tracing acceleration data structure traversal circuit to perform intersection testing to thereby determine any geometry that is intersected by a ray; and
    perform further processing for a sampling position in a frame that a ray corresponds to in accordance with any geometry for the scene determined to be intersected by the ray.

11. The graphics processor of claim 10, wherein the message that is sent from the programmable execution unit to the ray tracing acceleration data structure traversal circuit indicates one or more of:
    the ray tracing acceleration data structure that is to be traversed;
    the originating position for the ray for which the traversal of the ray tracing acceleration data structure is to be determined;
    a direction vector for the ray that is to traverse the ray tracing acceleration data structure; and
    a minimum and/or maximum distance that the ray is to traverse into the scene.

12. The graphics processor of claim 10, wherein the programmable execution unit is configured to send the message to the ray tracing acceleration data structure traversal circuit in response to executing an instruction that triggers the programmable execution unit to send the message to the ray tracing acceleration data structure traversal circuit.

13. The graphics processor of claim 10, wherein the ray tracing acceleration data structure traversal operation for a ray comprises traversing plural ray tracing acceleration data structures for the ray, to thereby determine geometry for the scene to be rendered that may be intersected by the ray.

14. The graphics processor of claim 10, wherein:
    the ray tracing acceleration data structure traversal circuit is configured to group rays for traversing a ray tracing acceleration data structure together, based on one or more of:
    the originating positions for the rays; and
    the direction vectors for the rays.

15. The graphics processor of claim 10, wherein the further processing for the sampling position in the frame that the ray corresponds to that is performed in accordance with any geometry for the scene determined to be intersected by the ray comprises one of:
    casting a further ray for the sampling position in question; and
    shading the sampling position so as to provide an output colour value for the sampling position for the frame.

16. The graphics processor of claim 10, wherein the further processing for the sampling position in the frame that the ray corresponds to that is performed in accordance with any geometry for the scene determined to be intersected by the ray is performed by the programmable execution unit executing further processing instructions that will cause the programmable execution unit to perform the required processing operations.

17. The graphics processor of claim 16, wherein there are plural different sets of further processing instructions to be executed in dependence upon the type of geometry that is determined and indicated by the ray tracing acceleration data structure traversal circuit.

18. The graphics processor of claim 16, wherein the graphics processor is configured to:
    generate a new execution thread for executing the further processing instructions that will cause the programmable execution unit to perform the further processing for the sampling position in the frame that the ray corresponds in accordance with any geometry for the scene determined to be intersected by the ray; and
    wherein:
    execution threads that are to be executed to continue the processing of sampling positions when ray traversal results are available are grouped together for execution by the programmable execution unit based on a property or properties of the geometry indicated by the ray tracing acceleration data structure traversal circuit for the corresponding rays.

19. A graphics processing system, the graphics processing system comprising:
    a graphics processor comprising:
        a programmable execution unit operable to execute graphics processing programs to perform graphics processing operations; and
        a ray tracing acceleration data structure traversal circuit operable to perform a traversal of a ray tracing acceleration data structure indicative of the distribution of geometry for a scene to be rendered to determine geometry for a scene to be rendered that may be intersected by a ray being used for a ray tracing operation;
    wherein:
        the programmable execution unit is operable to communicate with the ray tracing acceleration data structure traversal circuit to cause the ray tracing acceleration data structure to perform a traversal of a ray tracing acceleration data structure for a ray, and to receive responses from the ray tracing data structure traversal circuit indicative of geometry that may be intersected by the ray that has been determined by the ray tracing acceleration data structure traversal circuit;

the graphics processing system further comprising:

a processing circuit configured to:

generate a graphics shader program or programs which, when executed by the programmable execution unit of the graphics processor, causes the graphics processor to render a frame that represents a view of a scene comprising one or more objects using a ray tracing process;

the generating a graphics shader program or programs which, when executed by the programmable execution unit of the graphics processor, causes the graphics processor to render a frame that represents a view of a scene comprising one or more objects using a ray tracing process comprising:

including in a shader program to be executed by the programmable execution unit of the graphics processor when rendering a frame that represents a view of a scene comprising one or more objects using a ray tracing process:

an instruction that when executed will cause the programmable execution unit to issue a message to the ray tracing acceleration data structure traversal circuit of the graphics processor, to cause the ray tracing acceleration data structure traversal circuit to perform a traversal of a ray tracing acceleration data structure for a scene for a ray to determine geometry for the scene that may be intersected by the ray; and provide the generated graphics shader program or programs to the graphics processor for execution by the programmable execution unit; and the programmable execution unit of the graphics processor being configured to:

execute the graphics shader program or programs to render a frame that represents a view of a scene comprising one or more objects using a ray tracing process; and when executing the program or programs, in response to the instruction that when executed will cause the programmable execution unit to issue a message to the ray tracing acceleration data structure traversal circuit of the graphics processor, to cause the ray tracing acceleration data structure traversal circuit to perform a traversal of a ray tracing acceleration data structure for a scene for a ray to determine geometry for the scene that may be intersected by the ray:

send a message to the ray tracing acceleration data structure traversal circuit to perform a traversal of a ray tracing acceleration data structure for the scene to determine geometry for the scene that may be intersected by the ray;

the ray tracing acceleration data structure traversal circuit is configured to, in response to the message from the programmable execution unit:

perform a traversal of a ray tracing acceleration data structure for the scene for the ray to determine geometry for the scene to be rendered that may be intersected by the ray and return to the programmable execution unit an indication of geometry that may be intersected by the ray; and the programmable execution unit is configured to:

execute further shader program instructions to:

use the indicated geometry determined by the ray tracing acceleration data structure traversal circuit to perform intersection testing to thereby determine any geometry that is intersected by the ray; and perform further processing for a sampling position in the frame that the ray corresponds to in accordance with any geometry for the scene determined to be intersected by the ray.

20. A non-transitory computer readable storage medium storing software code which when executing on a processor performs a method of compiling a shader program to be executed by a programmable execution unit of a graphics processor that is operable to execute graphics processing programs to perform graphics processing operations;

the method comprising:

including in a shader program to be executed by a programmable execution unit of a graphics processor when rendering a frame that represents a view of a scene comprising one or more objects using a ray tracing process:

one or more instructions that when executed will:

cause the programmable execution unit to issue a message to a ray tracing acceleration data structure traversal circuit of the graphics processor that is operable to perform a traversal of a ray tracing acceleration data structure indicative of the distribution of geometry for a scene to be rendered to determine geometry for a scene to be rendered that may be intersected by a ray being used for a ray tracing operation, to cause the ray tracing acceleration data structure traversal circuit to perform a traversal of a ray tracing acceleration data structure for a scene for a ray to determine geometry for the scene that may be intersected by the ray; and cause the programmable execution unit to use the indicated geometry determined by the ray tracing acceleration data structure traversal circuit to perform intersection testing to thereby determine any geometry that is intersected by the ray.

* * * * *